United States Patent
Kiuchi et al.

[11] Patent Number: 5,867,009
[45] Date of Patent: Feb. 2, 1999

[54] CONTROL SYSTEM FOR ELECTRIC POWER GENERATING APPARATUS ON HYBRID VEHICLE

[75] Inventors: Takeo Kiuchi; Yutaka Tamagawa; Shigeru Ibaraki, all of Wako, Japan

[73] Assignee: Honda Giken Kogyo Kabushiki Kaisha, Tokyo, Japan

[21] Appl. No.: 632,518

[22] Filed: Apr. 12, 1996

[30] Foreign Application Priority Data

Apr. 28, 1995 [JP] Japan ................................. 7-106242

[51] Int. Cl.$^6$ ..................................................... H02P 9/04
[52] U.S. Cl. ............................ 322/16; 320/61; 180/165; 364/424.05
[58] Field of Search .......................... 322/16, 28; 320/61; 180/165; 364/424.05

[56] References Cited

U.S. PATENT DOCUMENTS

| | | | |
|---|---|---|---|
| 4,282,947 | 8/1981 | Kemper | 180/165 |
| 5,001,640 | 3/1991 | Matsumoto et al. | 364/426.02 |
| 5,264,764 | 11/1993 | Kuang | 318/139 |
| 5,272,428 | 12/1993 | Spiegel et al. | 318/803 |
| 5,345,761 | 9/1994 | King et al. | 60/274 |
| 5,390,117 | 2/1995 | Graf et al. | 364/424.1 |
| 5,459,816 | 10/1995 | Basehore et al. | 395/3 |
| 5,549,152 | 8/1996 | Davis, Jr. et al. | 165/201 |

OTHER PUBLICATIONS

"Fuzzy Logic Based Efficiency Improvement of an Urban Electric Vehicle", E. Cerruto et al., Published IEEE 1994.
Search Report.

*Primary Examiner*—Steven L. Stephan
*Assistant Examiner*—Nicholas Ponomarenko
*Attorney, Agent, or Firm*—Lyon & Lyon LLP

[57] ABSTRACT

An electric power generating apparatus having an electric generator is mounted on a hybrid vehicle which has a propulsive electric motor powered by a battery and an internal combustion engine for actuating the electric generator to generate an electric power output to charge the battery. A goodness-of-fit calculator and a generator operational amount calculator determine an operational amount for the electric generator based on a membership function and fuzzy rules stored in a fuzzy reasoning memory according to fuzzy reasoning from vehicle operating conditions including a charged and discharged condition of the battery and a vehicle speed of the hybrid vehicle, detected by operating condition detectors.

7 Claims, 17 Drawing Sheets

ECU, GCU DATA OUTPUT PROCESS

TABLE FOR WARMING-UP

TABLE FOR WARMING-UP

TABLE FOR WARMING-UP

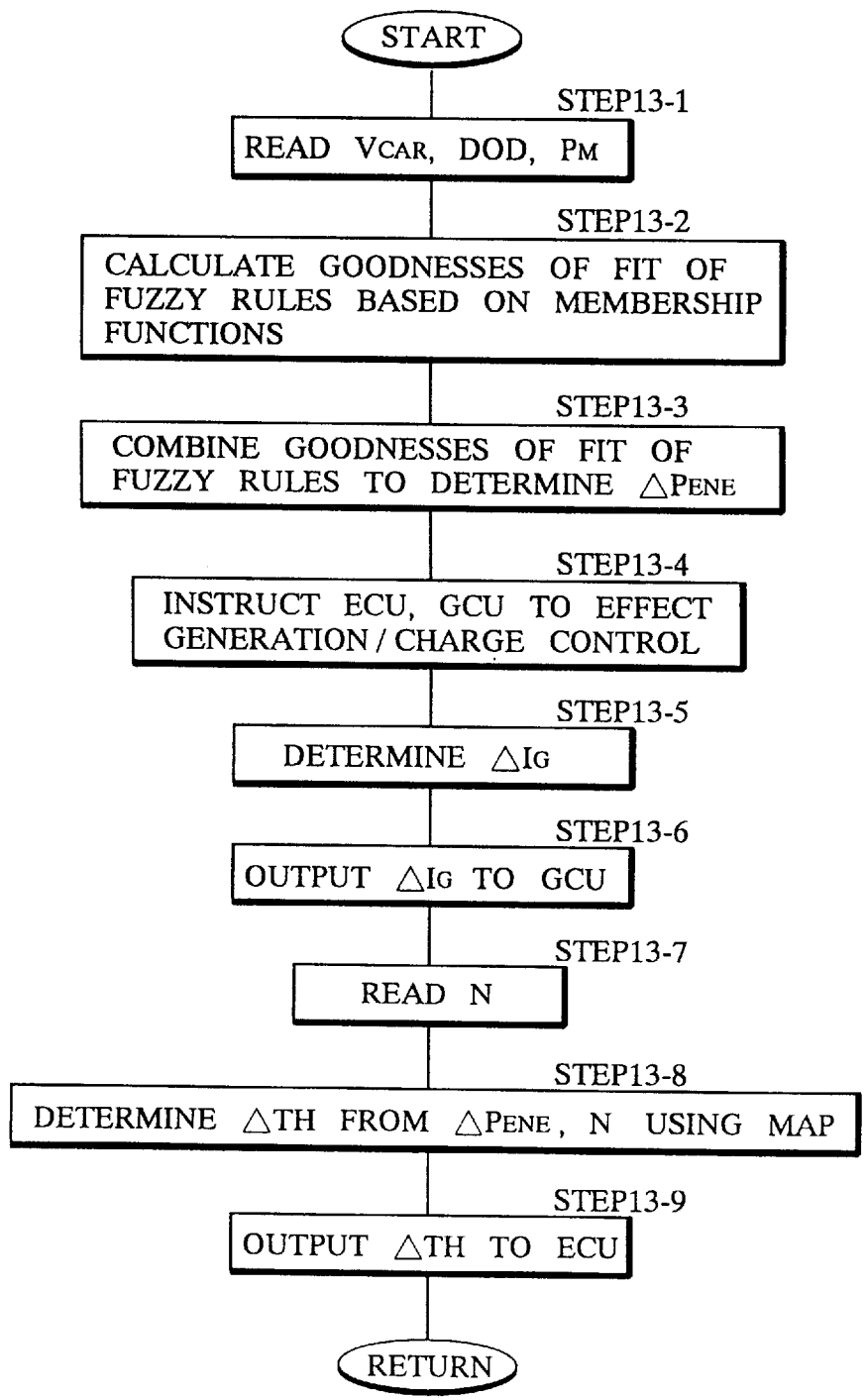

FIG. 15

GENERATION / CHARGE MAP

|  | N0 | N1 | ---------- | Nx |
|---|---|---|---|---|
| △PENE0 |  |  |  |  |
| △PENE1 |  |  |  |  |
| ⋮ |  | △TH |  |  |
|  |  |  |  |  |
|  |  |  |  |  |
| △PENEy |  |  |  |  |

TABLE FOR PURGING

TABLE FOR PURGING

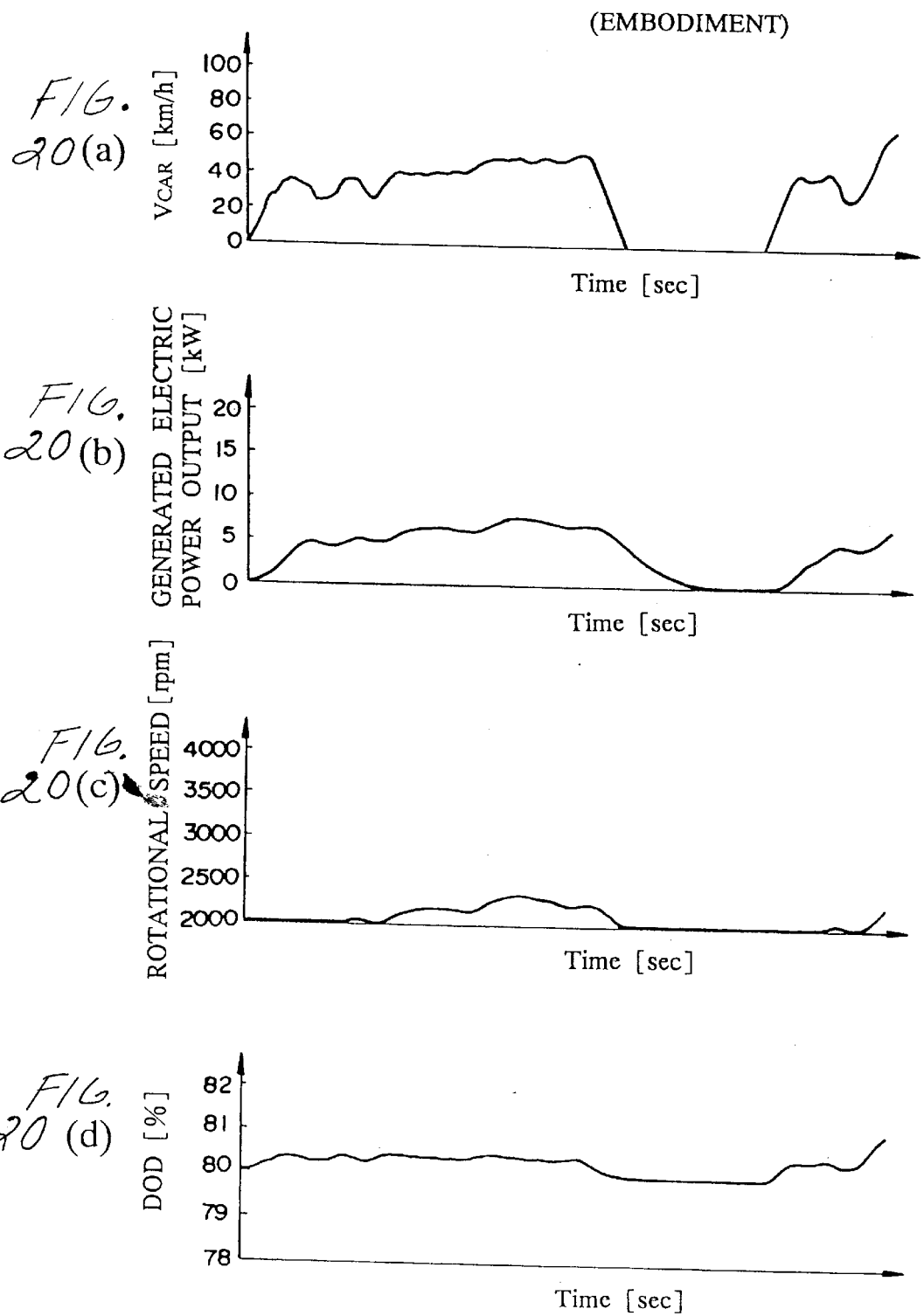
FIG. 20(a), FIG. 20(b), FIG. 20(c), FIG. 20(d) (EMBODIMENT)

(PRIOR ART)

5,867,009

CONTROL SYSTEM FOR ELECTRIC POWER GENERATING APPARATUS ON HYBRID VEHICLE

BACKGROUND OF THE INVENTION

1. Field of the Invention

The present invention relates to a control system for controlling an electric power generating apparatus on a hybrid vehicle.

2. Description of the Related Art

Electric vehicles propelled by a propulsive electric motor which is powered by a battery include hybrid vehicles which carry an electric power generating apparatus including an electric generator powered by an internal combustion engine for improving the mileage of the vehicle and increasing the service life of the battery. While the hybrid vehicle is running, the electric generator is operated by the internal combustion engine to output electric power which is supplied to charge the battery.

It is customary for such hybrid vehicles to detect, from time to time, the remaining electric energy stored in the battery and control the internal combustion engine or the electric generator to produce an amount of electric power depending on the detected remaining electric energy stored in the battery.

If the amount of electric power generated by the electric generator is controlled depending on only the remaining electric energy stored in the battery, however, the battery tends to be excessively charged at the time the vehicle runs at a lower speed when the propulsive electric motor consumes a smaller amount of electric power, and the battery tends to be insufficiently charged at the time the vehicle runs at a higher speed when the propulsive electric motor consumes a greater amount of electric power because the electric generator generates the same amount of electric power in either case insofar as the remaining electric energy stored in the battery is the same. As a consequence, the electric generator cannot generate electric power to charge the battery efficiently in a manner to make up for the consumption of stored electric energy by the battery in various running conditions of the vehicle.

The inventors have proposed an electric power generation control system for detecting, from time to time, the remaining electric energy stored in a battery and the speed of a hybrid vehicle and controlling the electric power generated by an electric generator depending on the remaining electric energy stored in the battery and the speed of the vehicle which have been detected, as disclosed in Japanese patent applications Nos. 6-197071 and 6-197072, for example. According to the proposed electric power generation control system, a target electric power to be outputted by the electric generator and a target rotational speed to be achieved by an internal combustion engine to operate the electric generator are determined from predetermined maps and tables depending on the remaining electric energy stored in the battery and the speed of the vehicle which have been detected. The current of the electric generator and the throttle opening of the internal combustion engine are controlled in order to achieve the target electric power and the target rotational speed.

The proposed electric power generation control system allows the electric generator to generate electric power to charge the battery efficiently in a manner to make up for the consumption of stored electric energy by the battery depending on the remaining amount of electric energy stored in the battery and in various running conditions of the vehicle.

With the proposed electric power generation control system, however, when the vehicle runs at frequently varying speeds, a target electric power to be outputted by the electric generator and a target rotational speed to be achieved by the internal combustion engine are determined exactly depending on such frequently varying speeds, so that the actual electric power outputted by the electric generator and the actual rotational speed of the internal combustion engine are subject to frequent variations. Accordingly, when the vehicle runs at frequently varying speeds, the load on the internal combustion engine and the rotational speed thereof are liable to vary, resulting in limitations posed on efforts to increase the emission and vibration control capabilities of the internal combustion engine.

SUMMARY OF THE INVENTION

It is therefore an object of the present invention to provide an electric power generation control system on a hybrid vehicle, which is capable of controlling electric power generation by an electric generator accurately depending on charging and discharging conditions of a battery and operating conditions of the hybrid vehicle such as a vehicle speed, and suppressing frequent variations of the load on and the rotational speed of an internal combustion engine which operates the electric generator, for thereby increasing the emission and vibration control capabilities of the internal combustion engine.

To achieve the above object, there is provided a control system for controlling an electric power generating apparatus having an electric generator and mounted on a hybrid vehicle which has a propulsive electric motor powered by a battery and an internal combustion engine for actuating the electric generator to generate an electric power output to charge the battery, comprising operating condition detecting means for detecting, from time to time, vehicle operating conditions including at least a charged and discharged condition of the battery and a vehicle speed of the hybrid vehicle, fuzzy reasoning memory means for storing beforehand a membership function and a plurality of fuzzy rules to determine an operational amount for the electric generator from the vehicle operating conditions by way of fuzzy reasoning, goodness-of-fit calculating means for determining goodnesses of fit of the respective fuzzy rules based on the membership function from the vehicle operating conditions detected by the operating condition detecting means, generator operational amount calculating means for combining the goodnesses of fit of the respective fuzzy rules determined by the goodness-of-fit calculating means and determining an operational amount for the electric generator based on the combined goodnesses of fit, and control means for controlling the electric power generating apparatus according to the operational amount for the electric generator determined by the generator operational amount calculating means.

The vehicle operating conditions include a power output produced by the propulsive electric motor, and the membership function and the fuzzy rules comprise a membership function and a plurality of fuzzy rules to determine an operational amount for the electric generator from the vehicle operating conditions including the charged and discharged condition of the battery and the power output produced by the propulsive electric motor by way of fuzzy reasoning.

With the above arrangement, the goodness-of-fit calculating means and the generator operational amount calculating means determine an operational amount for the electric generator based on the membership function and the fuzzy rules stored in the fuzzy reasoning memory means according to the fuzzy reasoning from the vehicle operating conditions including the charged and discharged condition of the battery and the vehicle speed of the hybrid vehicle, detected by the operating condition detecting means. Therefore, the operational amount for the electric generator which fits the vehicle operating conditions is determined after a plurality of modes of operation of the electric generator depending on the vehicle operating conditions represented by the fuzzy rules have been judged as a whole. Since the electric power generating apparatus is controlled according to the determined operational amount, the electric power output generated by the electric generator matches the vehicle operating conditions, and the operational amount for the electric generator is less liable to vary as the vehicle operating conditions including the vehicle speed vary. Consequently, the electric power output generated by the electric generator varies smoothly. As a result, the electric power generation by the electric generator can adequately be controlled depending on the operating conditions of the hybrid vehicle including the charged and discharged condition of the battery and the vehicle speed, and the load on and the rotational speed of the internal combustion engine which actuates the electric generator are prevented from frequently varying. The emission and vibration control capabilities of the internal combustion engine can thus be improved.

The vehicle operating conditions additionally include the power output produced by the propulsive electric motor in addition to the charged and discharged condition of the battery and the vehicle speed. Therefore, even when the power output produced by the propulsive electric motor is quickly increased as when the hybrid vehicle is quickly accelerated, the electric generator can generate an electric power output to make up for the quickly increased power output produced by the propulsive electric motor. Accordingly, the electric power generation by the electric generator can be controlled in a manner to suit the condition in which the battery is used.

The fuzzy rules may be determined so as to increase the electric power output generated by the electric generator as an amount of electric energy stored in the battery which is represented by the charged and discharged condition of the battery decreases, or as the vehicle speed increases, or as the power output produced by the propulsive electric motor increases.

If the operational amount for the electric generator determined by the generator operational amount calculating means comprises an incremental/decremental amount for the electric power output generated by the electric generator, a throttle valve opening of the internal combustion engine is increased or reduced to increase or reduce electric power output generated by the electric generator with the incremental/decremental amount (operational amount). With this arrangement, the electric power output generated by the electric generator can easily be controlled in a manner to suit the vehicle operating conditions.

An incremental/decremental amount for the throttle valve opening to increase or reduce the throttle valve opening may be established depending on the operational amount for the electric generator (incremental/decremental amount for the generated electric power output) determined by the generator operational amount calculating means and a rotational speed of the internal combustion engine. With this arrangement, the throttle valve opening can adequately be increased or reduced for increasing or reducing the electric power output generated by the electric generator according to the incremental/decremental amount.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 13 is a flowchart of a still further subroutine in the main routine shown in FIG. 2;

FIG. 15 is a diagram showing a map used in the subroutine shown in FIG. 13;

DETAILED DESCRIPTION OF THE PREFERRED EMBODIMENT

Figure 1:
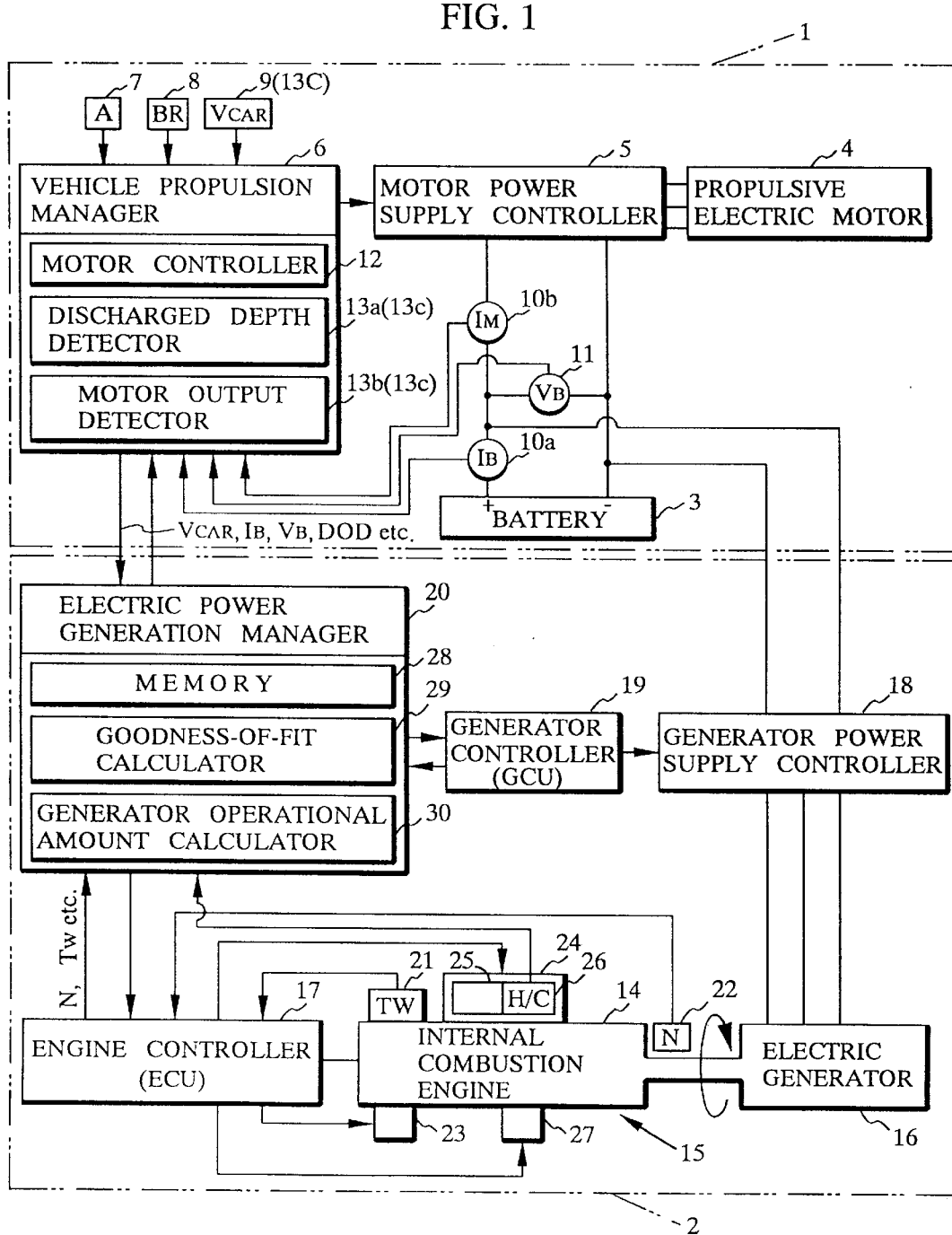
FIG. 1 is a block diagram of a hybrid vehicle which has a control system for controlling an electric power generating apparatus on the hybrid vehicle according to the present invention.

As shown in FIG. 1, a hybrid vehicle which has a control system for controlling an electric power generating apparatus on the hybrid vehicle according to the present invention, generally comprises a vehicle propulsion apparatus 1 and an electric power generating apparatus 2.

The vehicle propulsion apparatus 1 comprises a battery 3, a propulsive electric motor 4 powered by the battery 3 for propelling the hybrid vehicle, a motor power supply controller 5 including an inverter circuit, etc. (not shown) for controlling the supply of electric power between the battery 3 and the propulsive electric motor 4, a vehicle propulsion manager 6 for controlling operation of the propulsive electric motor 4 through the motor power supply controller 5 and detecting the depth to which the battery 3 is discharged (hereinafter referred to as a "discharged depth"), etc., an accelerator operation sensor 7 for detecting the amount by which the accelerator pedal is operated by the driver of the hybrid vehicle (hereinafter referred to as a "accelerator operational amount A"), a brake switch 8 for detecting whether the brake of the hybrid vehicle is operated by the driver or not, a vehicle speed sensor 9 for detecting a vehicle speed VCAR of the hybrid vehicle, a current sensor 10a for detecting a discharging current and a charging current of the battery 3 (hereinafter referred to as a "battery current IB"), a current sensor 10b for detecting a current flowing through the propulsive motor 4 (hereinafter referred to as a "motor current IM"), and a voltage sensor 11 for detecting a voltage across the battery 3 (hereinafter referred to as a "battery voltage VB").

The vehicle propulsion manager 6 is implemented by a microcomputer or the like, and has, as its main functional units, a motor controller 12 for controlling operation of the propulsive electric motor 4 through the motor power supply controller 5 based on detected signals from the accelerator operation sensor 7, the brake switch 8, and the vehicle speed sensor 9, a discharged depth detector 13a for detecting a discharged depth indicative of an amount of electric energy stored in the battery 3 based on detected signals from the current sensor 10a and the voltage sensor 11, and a motor output detector 13b for detecting an electric power consumed by the propulsive electric motor 4 (an output power produced by the propulsive electric motor 4) based on detected signals from the current sensor 10b and the voltage sensor 11.

The motor controller 12 basically determines a target torque and a target rotational speed for the propulsive electric motor 4 according to predetermined maps or the like based on the accelerator operational amount A detected by the accelerator operation sensor 7 and the vehicle speed VCAR detected by the vehicle speed sensor 9, and supplies the target torque and the target rotational speed which are determined to the motor power supply controller 5. The motor power supply controller 5 controls the amount of electric power supplied from the battery 3 to the propulsive electric motor 4 with switching pulses in order to operate the propulsive electric motor 4 at the target rotational speed to produce the target torque.

The motor controller 12 also instructs the motor power supply controller 5 to subject the propulsive electric motor 4 to regenerative braking when the accelerator operational amount A detected by the accelerator operation sensor 7 is reduced while the hybrid vehicle is running or the brake switch 8 outputs a brake signal BR indicating that the hybrid vehicle is braked. At this time, the motor power supply controller 5 causes the propulsive electric motor 4 to output a regenerated current and supplies the regenerative current to the battery 3, so that the propulsive electric motor 4 is subjected to regenerative braking. The regenerated current is detected by the current sensor 10b as a motor current IM flowing from the propulsive electric motor 4 through the motor power supply controller 5 to the battery 3.

The discharged depth detector 13a basically integrates the product of a battery current IB and a battery voltage VB, i.e., an electric power, which are detected at every given sampling time by the current sensor 10a and the voltage sensor 11, to determine an amount of discharged electric energy and an amount of charged electric energy on the basis of a fully charged condition of the battery 3, for thereby detecting a discharged depth DOD of the battery 3 from time to time. The discharged depth DOD of the battery 3 is 0% when the battery 3 is in a fully charged condition and 100% when the battery 3 is in a fully discharged condition, and increases from 0% to 100% as the amount of electric energy stored in the battery 3 (remaining capacity of the battery 3) decreases from the fully charged condition.

The motor output detector 13b detects the product of a motor current IM and a battery voltage VB which are detected at every given sampling time by the current sensor 10b and the voltage sensor 11, as an electric power PM consumed by the propulsive electric motor 4 (an output power produced by the propulsive electric motor 4). The electric power PM consumed by the propulsive electric motor 4 as detected by the motor output detector 13b is of positive polarity when the propulsive electric motor 4 is normally energized, i.e., when the motor current IM flows from the battery 3 to the propulsive electric motor 4, and of negative polarity when the propulsive electric motor 4 is subjected to regenerative braking, i.e., when the motor current IM flows from the propulsive electric motor 4 to the battery 3.

The discharged depth detector 13a, the vehicle speed sensor 9, and the motor output detector 13b jointly make up a vehicle operating condition detector 13c. The vehicle propulsion manager 6 outputs the discharged depth DOD detected by the discharged depth detector 13a, the vehicle speed VCAR detected by the vehicle speed sensor 9, and the electric power PM consumed by the propulsive electric motor 4 detected by the motor output detector 13b, as information indicative of vehicle operating conditions to a electric power generation manager 20 (described later on). The vehicle propulsion manager 6 also outputs a battery current IB detected by the current sensor 10a, a battery voltage VB detected by the voltage sensor 11, a command signal produced for regenerative braking by the motor controller 12, and a signal indicative of an amount of regenerated electric power to the electric power generation manager 20.

The propulsive electric motor 4 transmits its propulsive forces through a power transmitting system (not shown) to drive wheels (not shown) of the hybrid vehicle thereby to propel the hybrid vehicle.

The electric power generating apparatus 2 comprises an engine system 15 including an internal combustion engine 14, an electric generator 16 powered by the internal combustion engine 14, an engine controller 17 (hereinafter referred to as an "ECU 17") for controlling operation of the engine system 15, a generator power supply controller 18 including an inverter circuit, etc. (not shown) for controlling the supply of electric power between the electric generator 16 and the battery 3 or the propulsive electric motor 4, a generator controller 19 (hereinafter referred to as a "GCU 19") for controlling operation of the electric generator 16 through the generator power supply controller 18, and an electric power generation manager 20 for managing and controlling the electric power generating apparatus 2 through the ECU 17 and the GCU 19.

The electric generator 16 has a rotor (not shown) coupled to the crankshaft (not shown) of the internal combustion engine 14 for rotation therewith at the same rotational speed as the rotational speed of the crankshaft.

The engine system 15 includes, as components associated with the internal combustion engine 14, a temperature sensor 21 for detecting an engine temperature (coolant temperature) TW of the internal combustion engine 14, a rotational speed sensor 22 for detecting a rotational speed N of the internal combustion engine 14 (=a rotational speed of the electric generator 16), a throttle valve actuator 23 for actuating a throttle valve (not shown) of the internal combustion engine 14, a fuel supply unit 24 for supplying fuel to the internal combustion engine 14, a canister 25 combined with the fuel supply unit 24, a hydrocarbon sensor 26 (purged gas adsorption detecting means, hereinafter referred to as an "H/C sensor 26") for detecting an adsorbed amount H/C of a purged gas (vaporized fuel) in the canister 25, and an ignition unit 27 for igniting fuel supplied to the internal combustion engine 14.

Each of the electric power generation manager 20, the ECU 17, and the GCU 19 is implemented by a microcomputer or the like. The electric power generation manager 20 serves to instruct the ECU 17 and the GCU 19 to operate the internal combustion engine 14 and the electric generator 16. According to instructions from the electric power generation manager 20, the ECU 17 controls operation of the internal combustion engine 14 through the throttle valve actuator 23, the fuel supply unit 24, and the ignition unit 27, and the GCU 19 controls operation of the electric generator 16 through the generator power supply controller 18. Details of operation of the electric power generation manager 20, the ECU 17, and the GCU 19 will be described later on.

The electric power generation manager 20 has, as its functional units, a memory 28 (fuzzy reasoning memory means) for storing beforehand membership functions, fuzzy rules, etc. to effect a fuzzy control process (described later on), a goodness-of-fit calculator 29 (goodness-of-fit calculating means) for effecting predetermined calculations based on the membership functions and the fuzzy rules, and a generator operational amount calculator 30 (generator operational amount calculating means).

The ECU 17 outputs an engine temperature TW detected by the temperature sensor 21 and a rotational speed N detected by the rotational speed sensor 22 to the electric power generation manager 20. The GCU 19 outputs a signal indicative of a voltage and a current generated by the electric generator 16 which is controlled by the generator power supply controller 18 to the electric power generation manager 20. The electric power generation manager 20 is also supplied with an adsorbed amount H/C of a purged gas in the canister 25 from the H/C sensor 26.

Operation of the control system according to the present invention will be described below.

Figure 2:
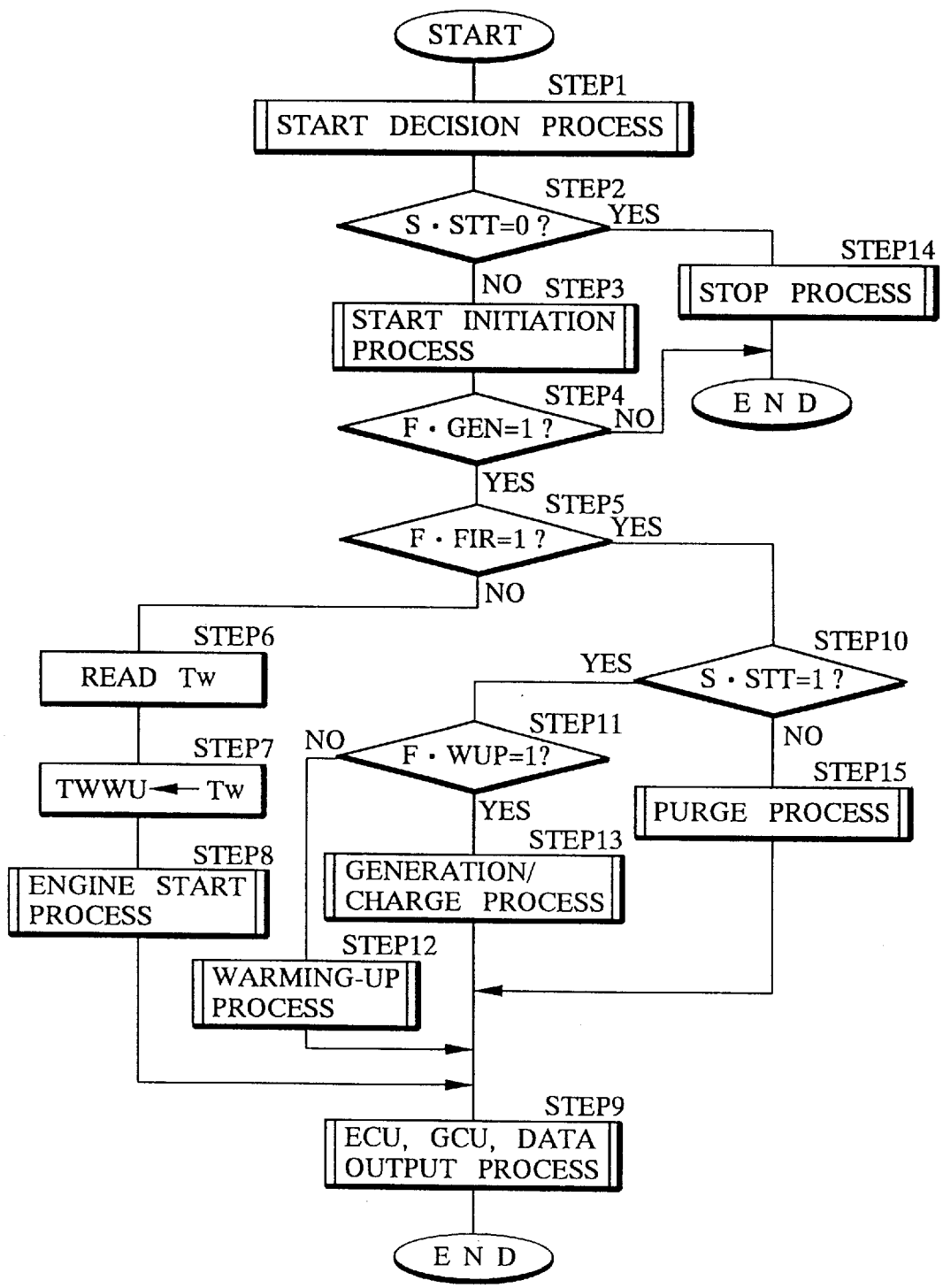
FIG. 2 is a flowchart of a main routine of an operation sequence of the control system shown in FIG. 1.

While the vehicle propulsion apparatus 1 is operating such as while the hybrid vehicle is running or temporarily stopping, the electric power generation manager 20 executes a main routine shown in FIG. 2, including various subroutines, in every cycle time of 10 ms, for example.

First, the electric power generation manager 20 executes a start decision process as a subroutine for deciding whether the electric power generating apparatus 2 is to be started or not and a mode of operation to start the electric power generating apparatus 2 (STEP 1).

Figure 3:
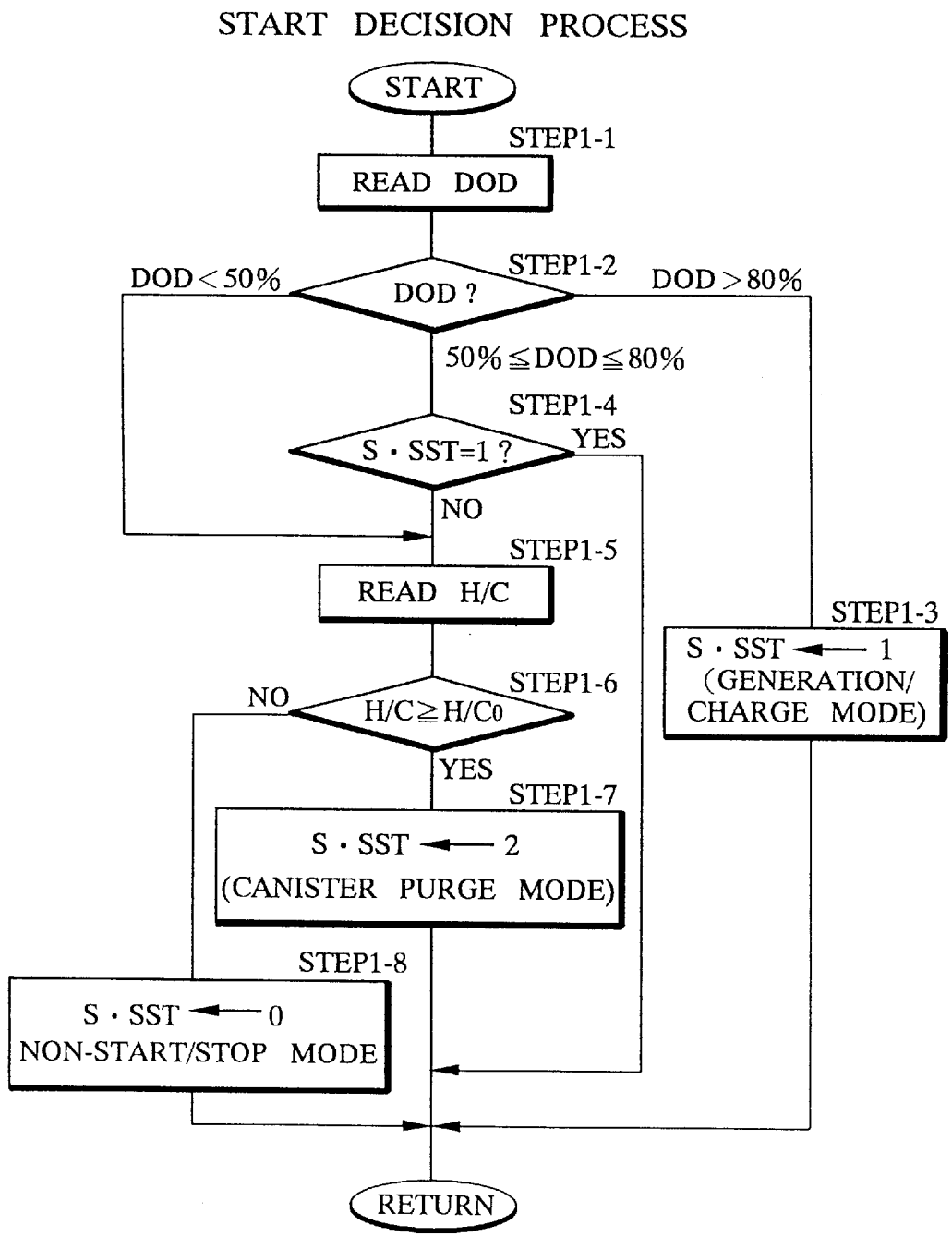
FIG. 3 is a flowchart of a subroutine in the main routine shown in FIG. 2.

In the start decision process, as shown in FIG. 3, the electric power generation manager 20 reads a present discharged depth DOD of the battery 3 from the vehicle propulsion manager 6 (STEP 1-1), and decides whether the present discharged depth DOD is DOD>80%, 50%≦DOD≦80%, or DOD<50% (STEP 1-2).

If DOD>80% in STEP 1-2, i.e., if the amount of electric energy stored in the battery 3 (remaining capacity of the battery 3) is considerably small, then the electric power generation manager 20 sets a start mode identifier S·SST to "1" (STEP 1-3). Thereafter, control returns to the main routine shown in FIG. 2. The start mode identifier S·SST can be set to either "0", "1", or "2". The start mode identifier S·SST which is set to "0" indicates a mode not to start the electric power generating apparatus 2 or to stop the electric power generating apparatus 2 (hereinafter referred to as a "non-start/stop mode"). The start mode identifier S·SST which is set to "1" indicates a mode to start the internal combustion engine 14 to enable the electric generator 16 to generate electric power to charge the battery 3 (hereinafter referred to as an "generation/charge mode"). The start mode identifier S·SST which is set to "2" indicates a mode to start the internal combustion engine 14 to effect a canister purge (hereinafter referred to as a "canister purge mode"), described later on. Since the start mode identifier S·SST is set to "1" in STEP 1-3, the electric power generating apparatus 2 is now in the generation/charge mode. The start mode identifier S·SST has its initial value set to "0".

If 50% ≦DOD≦80% in STEP 1-2, the electric power generation manager 20 ascertains a present value of the start mode identifier S·SST (STEP 1-4). If S·SST=1, i.e., if the electric power generating apparatus 2 is already in the generation/charge mode, then the start mode identifier S·SST is kept as it is, and control returns to the main routine shown in FIG. 2.

If S·SST≠1 in STEP 1-4, then the electric power generation manager 20 reads a present adsorbed amount H/C of a purged gas in the canister 25 from the H/C sensor 26 (STEP 1-5), and then decides whether or not the adsorbed amount H/C is equal or greater than a predetermined adsorbed amount H/C0 (STEP 1-6). If H/C≧H/C0, i.e., if the adsorbed amount H/C of a purged gas in the canister 25 has reached such a level that the canister 25 should be purged, then the electric power generation manager 20 sets the start mode identifier S·SST to "2" (STEP 1-7). Thereafter, control returns to the main routine shown in FIG. 2. The electric power generating apparatus 2 is now in the canister purge mode.

If H/C<H/C0 in STEP 1-6, i.e., if the adsorbed amount H/C of a purged gas in the canister 25 is not so large, then the electric power generation manager 20 sets the start mode identifier S·SST to "0" (STEP 1-8). Thereafter, control returns to the main routine shown in FIG. 2. The electric power generating apparatus 2 is now in the nonstart/stop mode.

If DOD<50% in STEP 1-2, i.e., if the amount of electric energy stored in the battery 3 is sufficiently large, then control jumps to STEP 1-5.

In the above start decision process, therefore, if the discharged depth DOD of the battery 3 exceeds 80%, indicating that the amount of electric energy stored in the battery 3 is considerably small, while the electric power generating apparatus 2 is stopped or stopping, then the electric power generating apparatus 2 enters the generation/charge mode (S·SST=1). Otherwise, the electric power generating apparatus 2 enters the canister purge mode (S·SST=2) or the non-start/stop mode (S·SST=0) depending on the adsorbed amount H/C of a purged gas in the canister 25. Once the generation/charge mode is established, it is maintained until the discharged depth DOD of the battery 3 drops below 50% and the amount of electric energy stored in the battery 3 is sufficiently recovered.

After the above start decision process, the electric power generation manager 20 operates in the manner described below. It is assumed in the following description that the electric power generating apparatus 2 which has been stopping is brought into the generation/charge mode (S·SST=1) (DOD>80%) in the start decision process.

After having established generation/charge mode (S·SST=1) in the start decision process in STEP 1 of the main routine shown in FIG. 2, the electric power generation manager 20 confirms that S·SST≠0 in STEP 2, and executes STEPs 3~9 in every cycle time to start the internal combustion engine 14.

Specifically, the electric power generation manager 20 executes a start initiation process as a subroutine for starting the ECU 17 and the GCU 19 in STEP 3.

Figure 4:
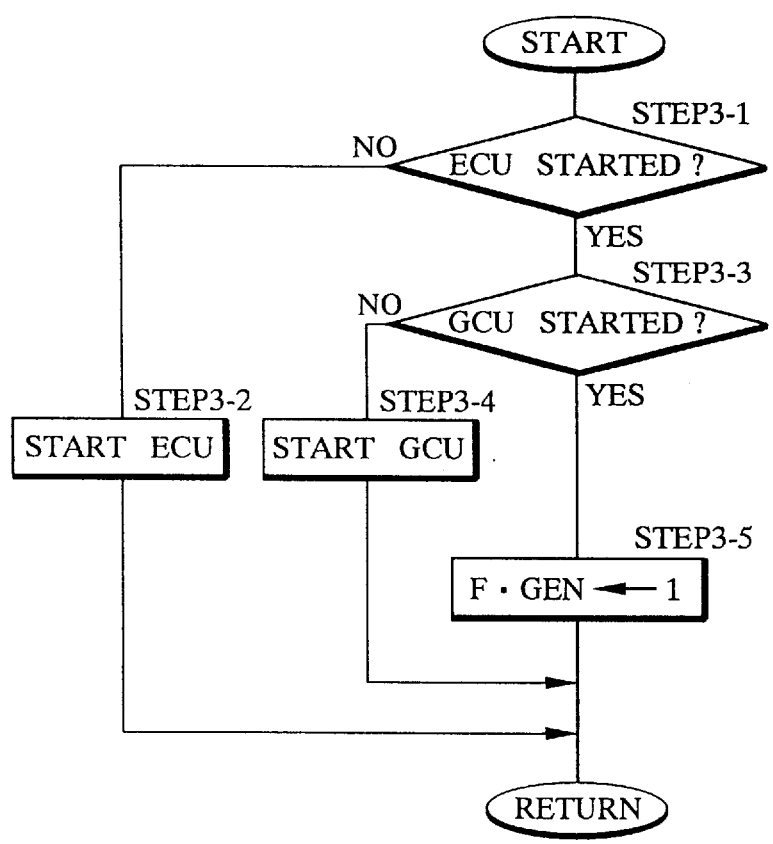
FIG. 4 is a flowchart of another subroutine in the main routine shown in FIG. 2.

In the start initiation process, as shown in FIG. 4, the electric power generation manager 20 decides whether the ECU 17 has started or not based on a response signal from the ECU 17 (STEP 3-1). If the ECU 17 has not started, then the electric power generation manager 20 gives a start command to the ECU 17 to start the ECU 17 (STEP 3-2), after which control returns to the main routine. If the ECU 17 has started in STEP 3-1, the electric power generation manager 20 decides whether the GCU 19 has started or not based on a response signal from the GCU 19 (STEP 3-3). If the GCU 19 has not started, then the electric power generation manager 20 gives a start command to the GCU 19 to start the GCU 19 (STEP 3-4), after which control returns to the main routine. If the GCU 19 has started in STEP 3-3, then the electric power generation manager 20 sets a flag F·GEN indicative of whether an actual start of the internal combustion engine 14 is to be initiated or not (hereinafter referred to as a "start initiation flag F·GEN") to "1" (STEP 3-5). Thereafter, control returns to the main routine. After control returns to the main routine, the value of the start initiation flag F·GEN is confirmed in STEP 4.

The start initiation flag F·GEN which is set to "1" indicates that preparations (the starting of the ECU 17 and the GCU 19) to actually start the internal combustion engine 14 are completed. The start initiation flag F·GEN which is set to "0" indicates that such preparations are not completed. The start initiation flag F·GEN has its initial value set to "0". When control returns from STEP 3-3 or STEP 3-4 to the main routine, the start initiation flag F·GEN maintains its initial value set to "0". Only if F·GEN=1 in STEP 4 of the main routine, control proceeds to STEP 5. If F·GEN=0 in STEP 4, then the main routine is ended.

Therefore, the ECU 17 and the GCU 19 are successively started in the start initiation process, and after they are started, control goes to STEP 5 of the main routine.

After having confirmed that F·GEN=1 in STEP 4, i.e., after having confirmed that preparations (the starting of the ECU 17 and the GCU 19) to actually start the internal combustion engine 14 are completed, the electric power generation manager 20 ascertains a flag F·FIR indicative of whether the internal combustion engine 14 is in a fully ignited condition or not, i.e., whether the starting of the internal combustion engine 14 is completed or not (hereinafter referred to as a "full ignition decision flag F·FIR").

The full ignition decision flag F·FIR is set to "1" when the full ignition of the internal combustion engine 14 is confirmed in an engine start process (STEP 8), descried later on. Therefore, the full ignition decision flag F·FIR is "0" when the internal combustion engine 14 is not started yet. In this case, control proceeds from STEP 5 to STEP 6.

After having confirmed that F·FIR≠1 in STEP 5, the electric power generation manager 20 reads a present engine temperature TW from the temperature sensor 21 through the ECU 17 (STEP 6), and establishes the read engine temperature TW as a parameter TWWU for determining a time to warm up the internal combustion engine 14 (hereinafter referred to as a "warming-up time determining parameter TWWU") (STEP 7). After the warming-up time determining parameter TWWU has once been established when the starting of the internal combustion engine 14 is initiated, the warming-up time determining parameter TWWU is not updated until the starting of the internal combustion engine 14 is resumed.

After having established the warming-up time determining parameter TWWU, the electric power generation manager 20 executes an engine start.process as a subroutine in STEP 8.

Figure 5:
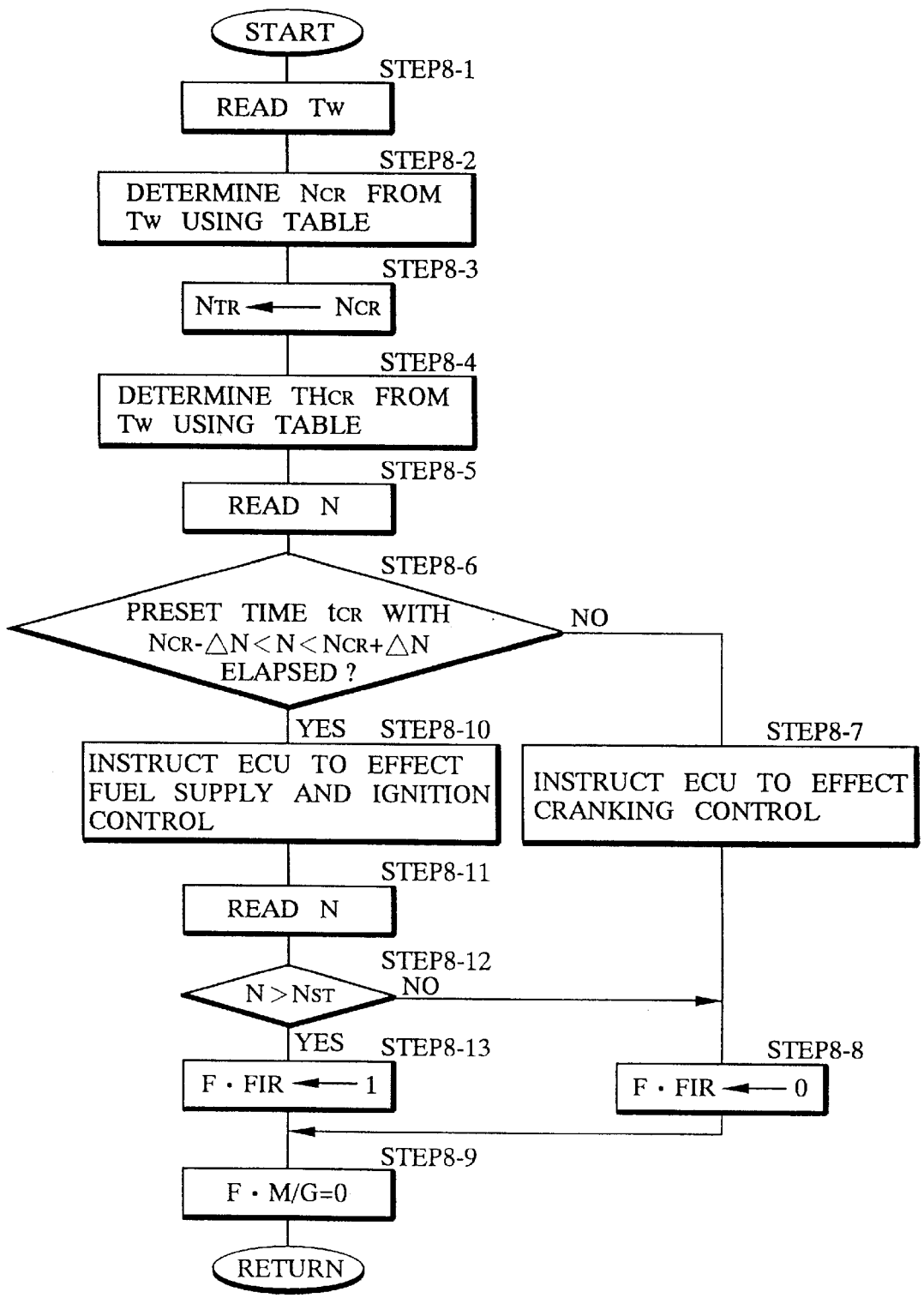
FIG. 5 is a flowchart of still another subroutine in the main routine shown in FIG. 2.
Figure 6:
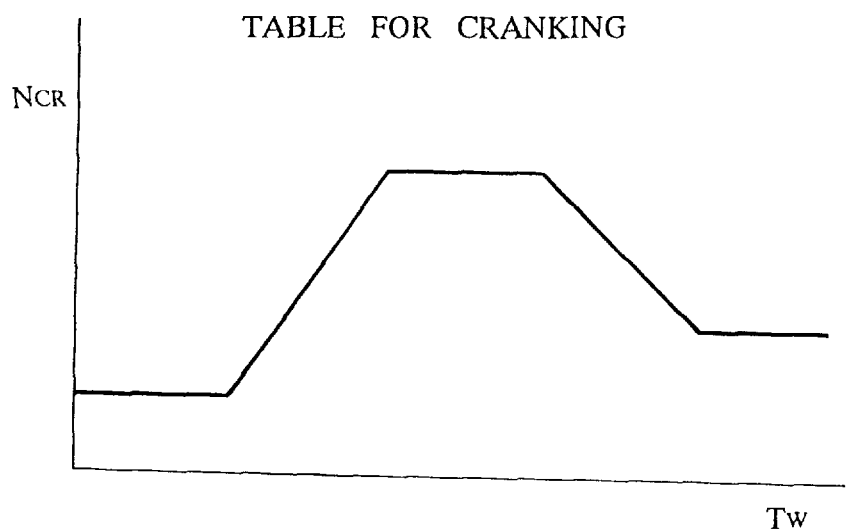
FIG. 6 is a diagram showing a data table used in the subroutine shown in FIG. 5.

In the engine start process, as shown in FIG. 5, the electric power generation manager 20 reads a present engine temperature TW from the temperature sensor 21 through the ECU 17 (STEP 8-1), and determines a cranking rotational speed NCR of the internal combustion engine 14 corresponding to the read engine temperature TW from the read engine temperature TW according to a data table shown in FIG. 6 (STEP 8-2). Then, the electric power generation manager 20 establishes the cranking rotational speed NCR as a target rotational speed NTR for the internal combustion engine 14 (STEP 8-3).

Figure 7:
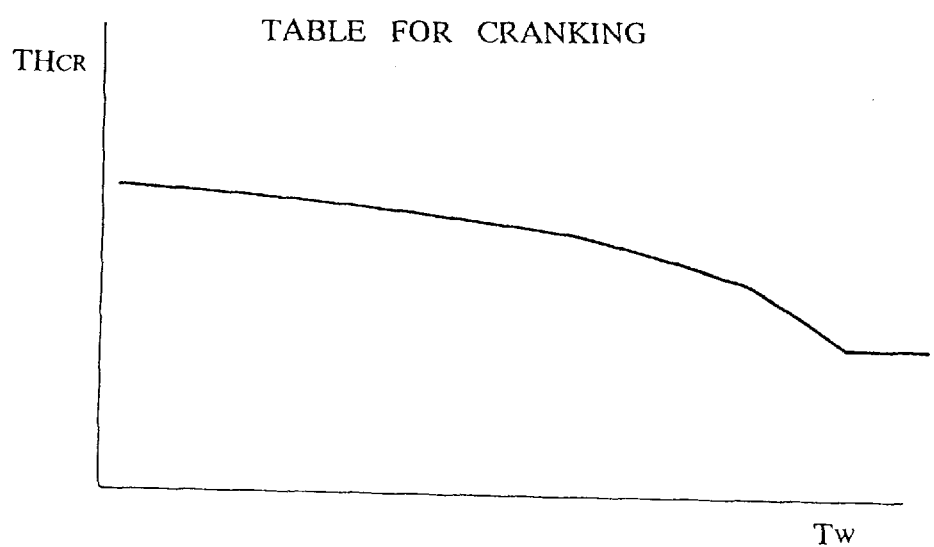
FIG. 7 is a diagram showing another data table used in the subroutine shown in FIG. 5.

The electric power generation manager 20 determines a throttle valve opening THCR of the internal combustion engine 14 corresponding to the engine temperature TW read in STEP 8-1 from the read engine temperature TW according to a data table shown in FIG. 7 (STEP 8-4). Cranking rotational speeds NCR shown in FIG. 6 and throttle valve openings THCR shown in FIG. 7 are determined in advance depending on engine temperatures TW, as rotational speeds and throttle valve openings capable of igniting and starting the internal combustion engine 14 for a better emission control capability of the internal combustion engine 14.

Then, the electric power generation manager 20 reads a present rotational speed N of the internal combustion engine 14 (=a rotational speed of the electric generator 16) from the rotational speed sensor 22 through the ECU 17 (STEP 8-5), and decides whether a preset time tCR has elapsed or not in which the read rotational speed N is kept in a predetermined range (NCR−ΔN<N<NCR+ΔN) with respect to the cranking rotational speed NCR determined in STEP 8-2 (STEP 8-6).

In this case, the preset time tCR has not elapsed because the internal combustion engine 14 has not started yet. The electric power generation manager 20 instructs the ECU 17 to effect cranking control on the internal combustion engine 14 (STEP 8-7), and sets the full ignition decision flag F·FIR to "0" (STEP 8-8). Thereafter, the electric power generation manager 20 sets a flag F·M/G indicative of whether the electric generator 16 is to operate as an electric generator or a starter motor of the internal combustion engine 14 (hereinafter referred to as a "generator/motor switching flag F·M/G") to "0" (STEP 8-9). Then, control returns to the main routine. The generator/motor switching flag F·M/G which is "0" indicates that the electric generator 16 is to operate as a starter motor of the internal combustion engine 14. The generator/motor switching flag F·M/G which is "1" indicates that the electric generator 16 is to operate as an electric generator.

After the above engine start process, the electric power generation manager 20 executes a data output process as subroutine for outputting data to the ECU 17 and the GCU 19 (STEP 9). Thereafter, the processing in the present cycle time is ended.

Figure 8:
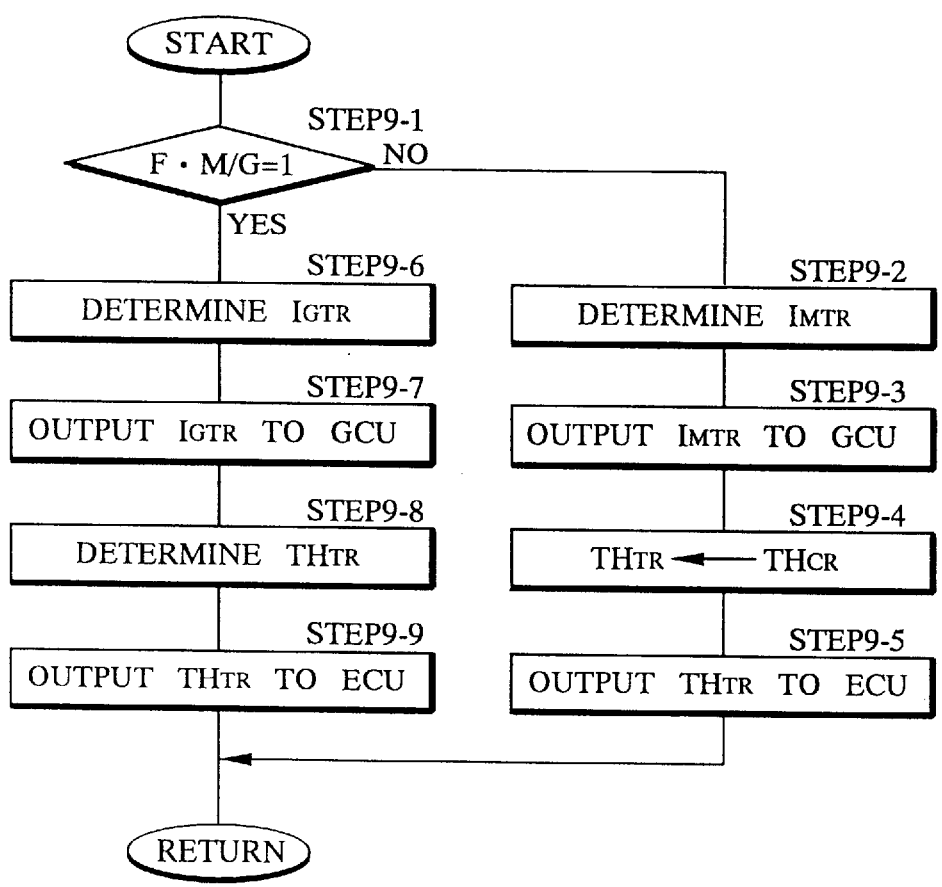
FIG. 8 is a flowchart of still another subroutine in the main routine shown in FIG. 2.

In the data output process, as shown in FIG. 8, the electric power generation manager 20 ascertains the generator/motor switching flag F·M/G in STEP 9-1. Since the generator/motor switching flag F·M/G has been set to "0" to operate the electric generator 16 as a starter motor, the electric power generation manager 20 determines a target amount IMTR of electric energy to be supplied to the electric generator 16 to operate the electric generator 16 as a starter motor (STEP 9-2), and outputs the target amount IMTR of electric energy to the GCU 19 (STEP 9-3). The target amount IMTR of electric energy is determined according to a given data table and equation as an amount of electric energy to be supplied to the electric generator 16 for bringing the present rotational speed N of the internal combustion engine 14 detected by the rotational speed sensor 22 into conformity with the cranking rotational speed NCR which has been established as the target rotational speed NTR in STEP 8-3 of the engine start process.

The electric power generation manager 20 establishes the throttle valve opening THCR which has been determined in STEP 8-4 of the engine start process as a target throttle valve opening THTR for the internal combustion engine 14 (STEP 9-4), and outputs the target throttle valve opening THTR to the ECU 17 (STEP 9-5). Thereafter, control goes back to the main routine.

The GCU 19 which is supplied with the target amount IMTR of electric energy controls the amount of electric energy supplied from the battery 3 to the electric generator 16 through the generator power supply controller 18 in order to operate the electric generator 16 as a starter motor for the internal combustion engine 14 according to the target amount IMTR of electric energy. The ECU 17 which is supplied with the target throttle valve opening THTR (=THCR) controls the throttle valve opening of the internal combustion engine 14 through the throttle valve actuator 23 in order to equalize the throttle valve opening of the internal combustion engine 14 to the target throttle valve opening THTR.

The internal combustion engine 14 now starts being cranked by the electric generator 16 operating as a starter motor.

The engine start process and the data output process are carried out in successive cycle times until the actual rotational speed N of the internal combustion engine 14 becomes substantially equal to the cranking rotational speed NCR, whereupon the condition in STEP 8-6 (see FIG. 5) of the engine start process is satisfied.

Then, as shown in FIG. 5, the electric power generation manager 20 instructs the ECU 17 to supply fuel to and ignite the internal combustion engine 14 (STEP 8-10). With the throttle valve opening of the internal combustion engine 14 being controlled at the target throttle valve opening THTR (=THCR), the ECU 17 controls the fuel supply unit 24 to supply fuel to the internal combustion engine 14 to start the same and also controls the ignition unit 27 to ignite the internal combustion engine 14 to start the same.

Thereafter, the electric power generation manager 20 reads a present rotational speed N of the internal combustion engine 14 from the rotational speed sensor 22 (STEP 8-11), and decides whether the rotational speed N has exceeded a predetermined starting rotational speed NST or not, thus deciding whether the internal combustion engine 14 has reached a fully ignited condition or not (STEP 8-12).

If N≦NST, then the electric power generation manager 20 judges that the internal combustion engine 14 has not reached a fully ignited condition, and sets the full ignition decision flag F·FIR to "0" in STEP 88 and the generator/motor switching flag F·M/G") to "0" (STEP 8-9). Thereafter, control returns to the main routine. After the data output process, the internal combustion engine 14 is continuously cranked by the electric generator 16 operating as a starter motor, and the ECU 17 continuously controls the fuel supply unit 24 to supply fuel to and the ignition unit 27 to ignite the internal combustion engine 14 for starting the same.

If N>NST in STEP 8-12, then electric power generation manager 20 judges that the internal combustion engine 14 has reached a fully ignited condition, and sets the full ignition decision flag F·FIR to "1" in STEP 8-13. Thereafter, control goes through STEP 8-9 and returns to the main routine.

If F·FIR=1, then control proceeds from STEP 5 to STEP 10 in a next cycle time. In STEP 10, the electric power generation manager 20 ascertains the start mode identifier S·SST. Since S·SST=1 (generation/charge mode) at this time, the electric power generation manager 20 ascertains a flag F·WUP indicative of whether the warming up of the internal combustion engine 14 has been finished or not (hereinafter referred to as a "warming-up decision flag F·WUP") (STEP 11).

The warming-up decision flag F·WUP is set "1" if an end of the warming up of the internal combustion engine 14 is confirmed in a warming-up process (STEP 12). Therefore, the warming-up decision flag F·WUP is "0" insofar as the internal combustion engine 14 is not warmed up.

If F·WUP=0 in STEP 11, the electric power generation manager 20 executes the warming-up process (STEP 12).

Figure 9:
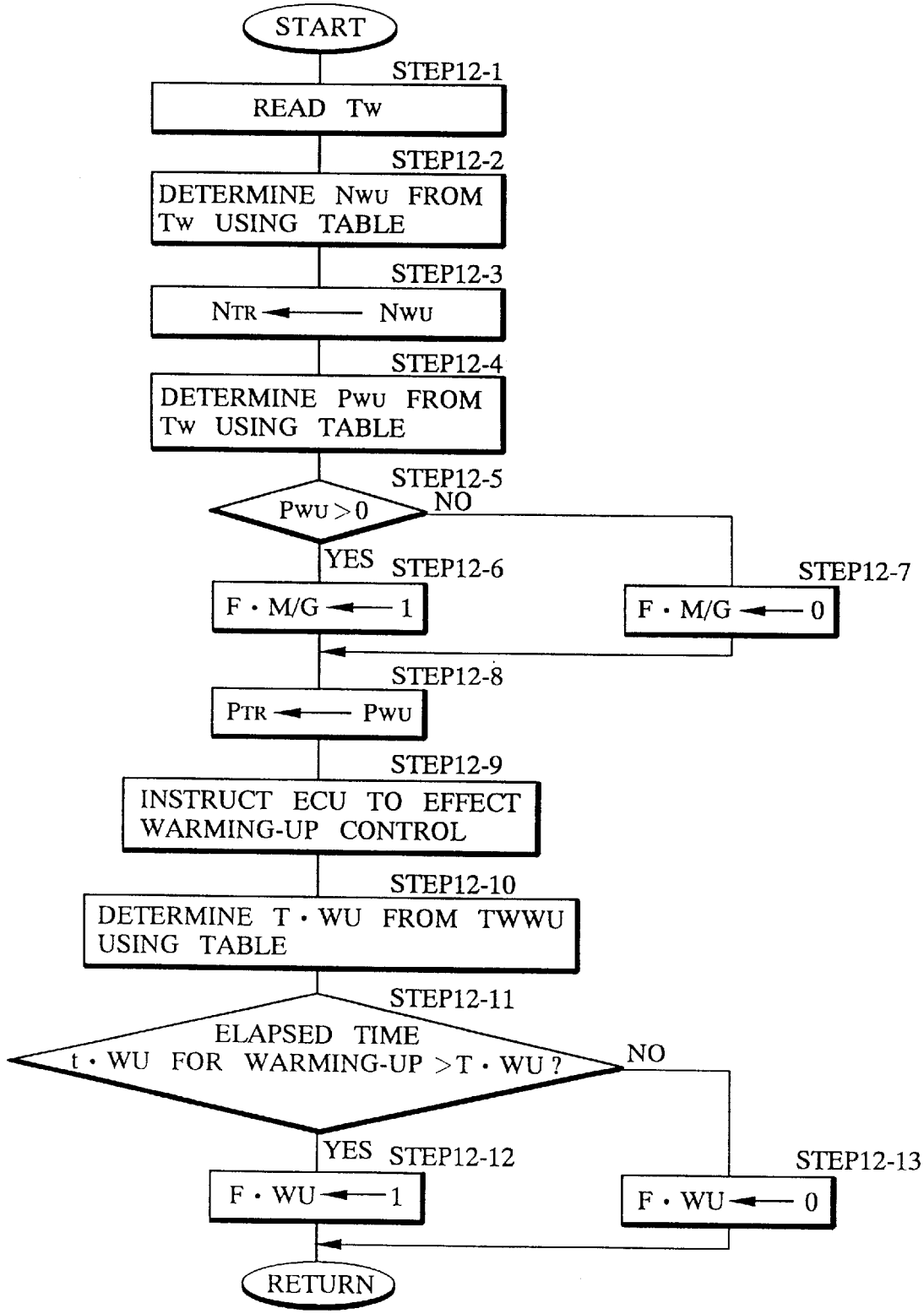
FIG. 9 is a flowchart of a further subroutine in the main routine shown in FIG. 2.
Figure 10:
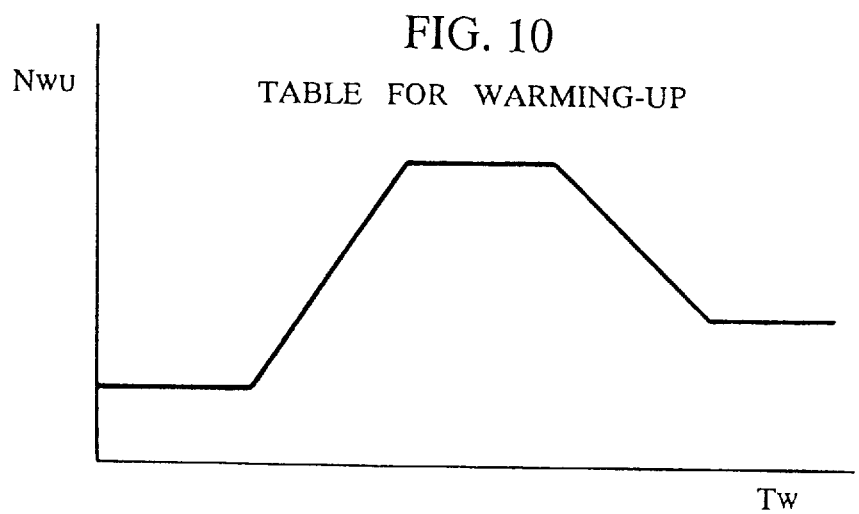
FIG. 10 is a diagram showing a data table used in the subroutine shown in FIG. 9.

In the warming-up process, as shown in FIG. 9, the electric power generation manager 20 reads an engine temperature TW from the temperature sensor 21 (STEP 12-1), and determines a warming-up rotational speed NWU to warm up the internal combustion engine 14 from the read engine temperature TW according to a data table shown in FIG. 10 (STEP 12-2). Then, the electric power generation manager 20 establishes the warming-up rotational speed NWU as a target rotational speed NTR for the internal combustion engine 14 (STEP 12-3).

Figure 11:
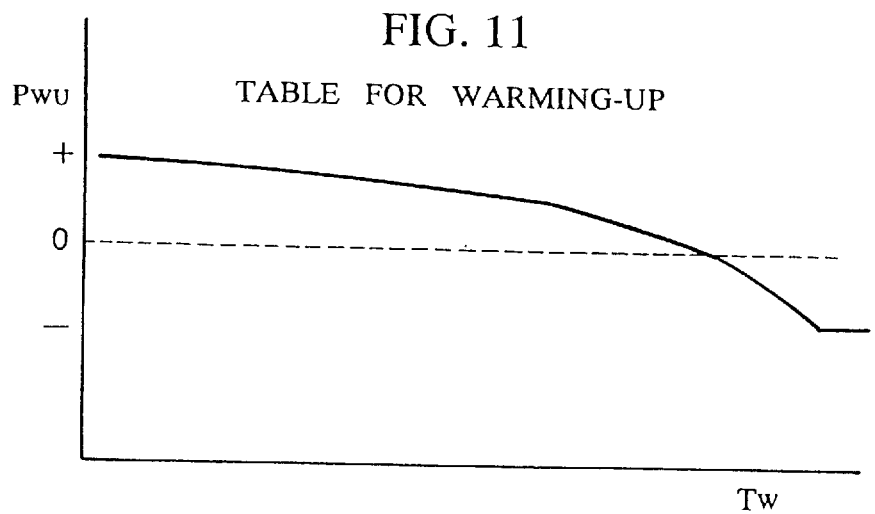
FIG. 11 is a diagram showing another data table used in the subroutine shown in FIG. 9.

In order to generate electric power with the electric generator 16 while the internal combustion engine 14 is being warmed up, the electric power generation manager 20 determines a warming-up electric power output PWU to be outputted from the electric generator 16 from the read engine temperature TW according to a data table shown in FIG. 11 (STEP 12-4). Warming-up rotational speeds NWU shown in FIG. 10 and warming-up electric power outputs PWU shown in FIG. 11 are determined in advance depending on engine temperatures TW, as rotational speeds and generated power outputs capable of stably warming up the internal combustion engine 14 and generating electric power with the electric generator 16 powered by the internal combustion engine 14 for a better emission control capability of the internal combustion engine 14. Inasmuch as the load on the internal combustion engine 14 should preferably be minimized for adequately warming up the internal combustion engine 14 when the internal combustion engine 14 is at higher temperatures, the warming-up electric power outputs PWU in the data table shown in FIG. 11 are negative in a high-temperature range of engine temperatures TW. Such negative warming-up electric power outputs PWU signify that the electric generator 16 operates as an electric motor rather than generating electric power.

Thereafter, the electric power generation manager 20 decides whether the warming-up electric power output Pwu thus determined is positive or not (STEP 12-5). If PWU>0, then the electric power generation manager 20 sets the generator/motor switching flag F·M/G to "1" in order to generate electric power with the electric generator 16 (STEP 126). If PWU≦0, then the electric power generation manager 20 sets the generator/motor switching flag F·M/G to "0" in order to operate the electric generator 16 as an electric motor (STEP 12-7).

After having set the generator/motor switching flag F·M/G, the electric power generation manager 20 establishes the warming-up electric power output PWU determined in STEP 12-4 as a target electric power output PTR for the electric generator 16 (STEP 12-8), and instructs the ECU 17 to warm up the internal combustion engine 14 (STEP 12-9).

Figure 12:
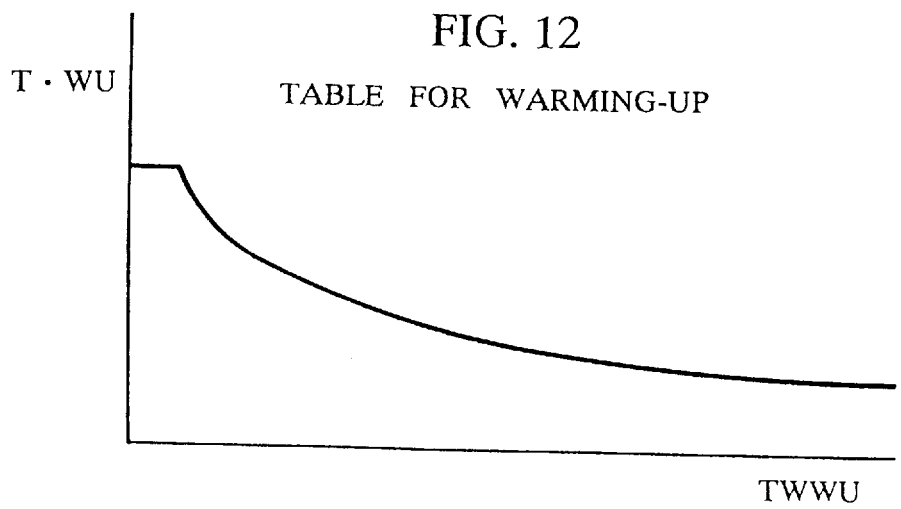
FIG. 12 is a diagram showing still another data table used in the subroutine shown in FIG. 9.

Then, the electric power generation manager 20 determines a time T·WU to warm up the internal combustion engine 14 (hereinafter referred to as a "warming-up indicating time T·WU") according to a data table shown in FIG. 12 from the warming-up time determining parameter TWWU (=the engine temperature TW at the time the starting of the internal combustion engine 14 is initiated) which has been determined in STEP 7 of the main routine when the starting of the internal combustion engine 14 is initiated (STEP 12-10). warming-up indicating times T·WU are determined in advance for adequately warming up the internal combustion engine 14 depending on warming-up time determining parameters TWWU which are engine temperatures TW at the time the starting of the internal combustion engine 14 is initiated.

After having determined the warming-up indicating time T·WU, the electric power generation manager 20 decides whether a time t-wu that has elapsed from STEP 12-1 of the warming-up process exceeds the warming-up indicating time T·WU or not (STEP 12-11). If t·WU>T·WU, then the electric power generation manager 20 sets the warming-up decision flag F·WUP to "1" in STEP 12-12. If t·WU≦T·WU, then the electric power generation manager 20 sets the warming-up decision flag F·WUP to "0" in STEP 12-13. Thereafter, control returns to the main routine. Immediately after the warming-up process has started in this case, the time t·WU≦T·WU, and the warming-up decision flag F·WUP is set to "0" in STEP 12-13.

After control returns to the main routine, the electric power generation manager 20 executes the data output process in STEP 9.

In the warming-up process (STEP 12), basically, the generator/motor switching flag F·M/G has been set to "1". In this case, after STEP 9-1 of the data output process, the electric power generation manager 20 determines a target amount IGTR of electric energy to be supplied by the electric generator 16 (STEP 9-6), and outputs the target amount IGTR of electric energy to the GCU 19 (STEP 9-7). The target amount IGTR of electric energy is determined according to a given data table and equation as an electric current to be supplied by the electric generator 16 (a charging current for the battery 3) for bringing an actual amount of electric power detected from a voltage and a current generated by the electric generator 16 and supplied from the GCU 19, and an actual rotational speed N of the engine 14 and the electric generator 16 detected by the rotational speed sensor 22 into conformity with the target rotational speed NTR (=the warming-up rotational speed NWU) established in STEP 12-3 and the target electric power output PTR (=the warming-up electric power output PWU). The electric power generation manager 20 monitors a command signal supplied from the vehicle propulsion manager 6 to subject the propulsive electric motor 4 to regenerative braking and an amount of regenerated electric power at the time. When the propulsive electric motor 4 is subjected to regenerative braking, the electric power generation manager 20 corrects the target electric power output PTR so that the sum of the regenerated electric power and the electric power generated by the electric generator 16 and the charging voltage of the battery 3 will not exceed predetermined maximum values for preventing the battery 3 from being excessively charged, and determines the target amount IGTR of electric energy depending on the corrected target electric power output PTR and the target rotational speed NTR.

The electric power generation manager 20 determines a target throttle valve opening THTR for the internal combustion engine 14 (STEP 9-8), and outputs the target throttle valve opening THTR to the ECU 17 (STEP 9-9). Thereafter, control goes back to the main routine. The target throttle valve opening THTR is determined according to a given data table and equation as a throttle valve opening for producing a power output of the internal combustion engine 14 corresponding to the target electric power output PTR and bringing the present rotational speed N of the internal combustion engine 14 into conformity with the target rotational speed NTR. When the propulsive electric motor 4 is subjected to regenerative braking, the target throttle valve opening THTR is determined depending on the corrected target electric power output PTR and the target rotational speed NTR in the same manner as described above.

The GCU 19 which is supplied with the target amount IGTR of electric energy controls the electric generator 16 through the generator power supply controller 18 in order to generate electric power with the electric generator 16 according to the target amount IGTR of electric energy. The ECU 17 which is supplied with the target throttle valve opening THTR controls the throttle valve opening of the internal combustion engine 14 through the throttle valve actuator 23 in order to equalize the throttle valve opening of the internal combustion engine 14 to the target throttle valve opening THTR.

The electric generator 16 is now powered by the internal combustion engine 14 as it is being warmed up to generate electric power depending on the target electric power output PTR (=PWU) and the target rotational speed NTR (=NWU), and the generated electric power is supplied to charge the battery 3 or energize the propulsive electric motor 4.

If the generator/motor switching flag F·M/G" is set to "0" in the warming-up process (STEP 12), then the electric power generation manager 20 executes STEPs 9-1~9-5 in the data output process in STEP 9 in the same manner as when the internal combustion engine 14 is started. In this case, the electric generator 16 operates as an electric motor while the internal combustion engine 14 is being warmed up.

The internal combustion engine 14 is warmed up in successive cycle times. If the time T·WU that has elapsed in warming up the internal combustion engine 14 exceeds the warming-up indicating time T·WU in STEP 12-11 (see FIG. 9) of the warming-up process, then the warming-up decision flag F·WUP is set to "1" (STEP 12-12) as described above. If F·WUP=1, then after STEP 11 (see FIG. 2) of the main routine in a next cycle time, the warming-up process is ended, and control proceeds to a generation/charge process (STEP 13) as a subroutine according to the present invention.

In the generation/charge process, as shown in FIG. 13, the electric power generation manager 20 reads a present vehicle speed VCAR from the vehicle speed sensor 9 through the vehicle propulsion manager 6, a present discharged depth DOD of the battery 3 from the discharged depth detector 13a, and a present electric power PM consumed by the propulsive electric motor 4 (an output power produced by the propulsive electric motor 4) from the motor output detector 13b (STEP 13-1).

From the vehicle speed VCAR, the discharged depth DOD, and the consumed electric power PM which have been read, the electric power generation manager 20 determines an incremental/decremental amount ΔPENE to be added to or subtracted from an electric power output generated by the electric generator 16 in order to obtain the electric power output corresponding to those vehicle operating conditions, as an operational amount for the electric generator 16 according to the following fuzzy reasoning:

The memory 28 of the electric power generation manager 20 stores predetermined membership functions corresponding respectively to the vehicle speed VCAR, the discharged depth DOD, the consumed electric power PM, and the incremental/decremental amount ΔPENE, as shown respectively in FIGS. 14(a) through 14(d). The memory 28 also stores a plurality of (eight in this embodiment) predetermined fuzzy rules for determining the incremental/decremental amount ΔPENE from the vehicle speed VCAR, the discharged depth DOD, and the consumed electric power PM, as shown in Table given below:

| Rule No. | Former part (IF) | Latter part (THEN) |
| --- | --- | --- |
| 1 | DOD is HIGH | ΔPENE is PB |
| 2 | DOD is LOW | ΔPENE is NS |
| 3 | DOD is MID and PM is MID | ΔPENE is ZERO |
| 4 | DOD is HIGH and VCAR is LOW | ΔPENE is PS |
| 5 | VCAR is HIGH and PM is HIGH | ΔPENE is PB |
| 6 | VCAR is HIGH and PM is LOW | ΔPENE is NS |
| 7 | VCAR is LOW and PM is HIGH | ΔPENE is PS |
| 8 | VCAR is LOW and PM is LOW | ΔPENE is NB |

The fuzzy rules are basically determined to positively increase the incremental/decremental amount ΔPENE (increase the generated electric power output) as either one of the vehicle speed VCAR, the discharged depth DOD, and the consumed electric power PM increases, and negatively increase the incremental/decremental amount ΔPENE (reduce the generated electric power output) as either one of the vehicle speed VCAR, the discharged depth DOD, and the consumed electric power PM decreases. However, as can be seen from the fuzzy rule No. 6 in above Table, if the electric power consumed by the propulsive electric motor 4 is small even when the vehicle speed VCAR is large such as when the vehicle runs at a constant speed, then the generated electric power output is reduced. As can be seen from the fuzzy rule No. 4 in above Table, if the vehicle speed VCAR is low even when the discharged depth DOD is large, then the incremental amount to be added to the generated electric power output is reduced. AS can be seen from the fuzzy rule No. 7 in above Table, if the electric power consumed by the propulsive electric motor 4 is large even when the vehicle speed VCAR is low such as when the vehicle is accelerated, then the generated electric power output is increased.

In the electric power generation manager 20, the goodness-of-fit calculator 29 determines a goodness of fit for each of the fuzzy rules according to a "MAX-MIN method" based on the membership functions from the vehicle speed VCAR, the discharged depth DOD, and the consumed electric power PM which have been read in STEP 13-1 (STEP 13-2). The generator operational amount calculator 30 then combines the goodnesses of fit thus determined to determine an incremental/decremental amount ΔPENE for the electric power output of the electric generator 16 according to the so-called centroid method (STEP 13-3).

Figure 14A:
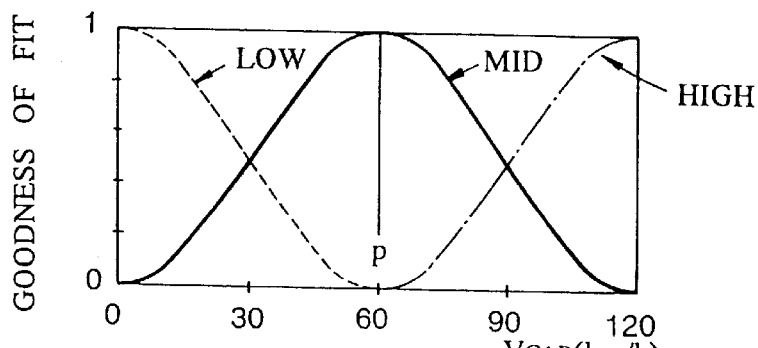
FIG. 14(a) is a diagram showing a membership function used in the subroutine shown in FIG. 13.
Figure 14B:
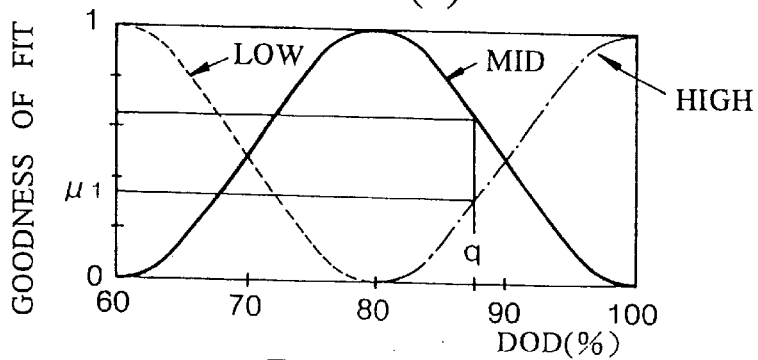
FIG. 14(b) is a diagram showing another membership function used in the subroutine shown in FIG. 13.
Figure 14C:
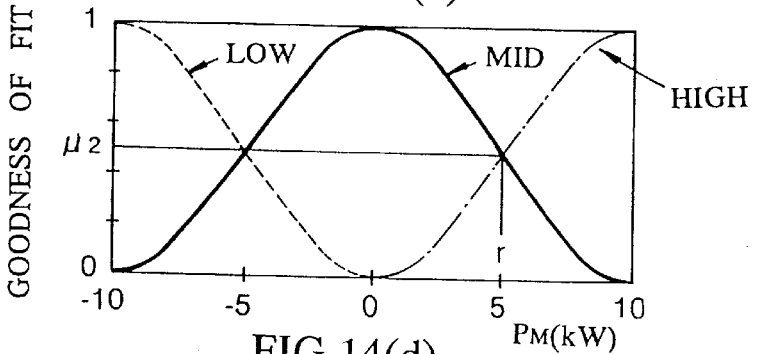
FIG. 14(c) is a diagram showing still another membership function used in the subroutine shown in FIG. 13.
Figure 14D:
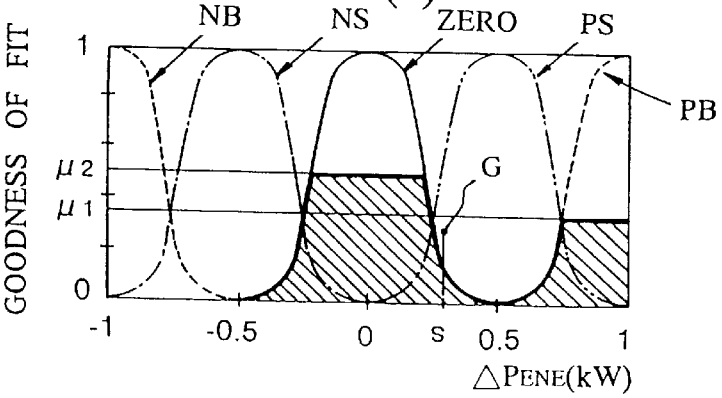
FIG. 14(d) is a diagram showing yet still another membership function used in the subroutine shown in FIG. 13.

Specifically, if the vehicle speed VCAR, the discharged depth DOD, and the consumed electric power PM which have been read have respective values p, q, r as shown in FIGS. 14(a)~14(c), then the goodnesses of fit of the fuzzy rules Nos. 2 and 4~8 in above Table are obviously "0", the goodness of fit of the fuzzy rule No. 1 is "$\mu 1$" as shown in FIGS. 14(b) and 14(d), and the goodness of fit of the fuzzy rule No. 3 is "$\mu 2$" as shown in FIGS. 14(c) and 14(d). These goodnesses of fit "$\mu 1$", "$\mu 2$" are applied to the membership functions corresponding to the incremental/decremental amount ΔPENE shown in FIG. 14(d) and combined with each other, thus producing a trapezoidal membership function shown hatched in FIG. 14(d). When the center G of gravity of the area shown hatched in FIG. 14(d) is determined, there is determined a value s of the incremental/decremental amount ΔPENE as an operational amount for the electric generator 16.

After having determined the incremental/decremental amount ΔPENE, the electric power generation manager 20 instructs the ECU 17 and the GCU 19 to carry out a generation/charge control process (STEP 13-4), then determines an incremental/decremental amount ΔIG, corresponding to the determined incremental/decremental amount ΔPENE, to be added to or subtracted from an electric current supplied by the electric generator 16, according to a predetermined equation (STEP 13-5), and outputs the determined incremental/decremental amount ΔIG to the GCU 19 (STEP 13-6).

Thereafter, the electric power generation manager 20 reads a present rotational speed N of the internal combustion engine 14 from the rotational speed sensor 22 (STEP 13-7). The electric power generation manager 20 determines an incremental/decremental amount ΔTH for the throttle valve opening which is required to increase or decrease the generated electric power output by the incremental/decremental amount ΔPENE, according to a map shown in FIG. 15 from the read rotational speed N and the incremental/decremental amount ΔPENE determined in STEP 13-3 (STEP 13-8), and outputs the incremental/decremental amount ΔTH to the ECU 17 (STEP 13-9). Thereafter, control returns to the main routine. The map shown in FIG. 15 contains incremental/decremental amounts ΔTH for the throttle valve corresponding to various rotational speeds N of the internal combustion engine 14 so as to increase or decrease the power output of the internal combustion engine 14 depending on the incremental/decremental amount ΔPENE. Having returned from the generation/charge process to the main routine, the electric power generation manager 20 does not carry out the data output process in STEP 9, but finishes the present processing cycle.

As described above, the GCU 19 which is supplied with the incremental/decremental amount ΔIG controls the electric generator 16 through the generator power supply controller 18 to increase or reduce the present electric current supplied to the electric generator 16 by the incremental/decremental amount ΔIG. The ECU 17 which is supplied with the incremental/decremental amounts ΔTH for the throttle valve increases or reduces the throttle valve opening of the internal combustion engine 14 through the throttle valve actuator 23 depending on the incremental/decremental amounts ΔTH.

The electric power output generated by the electric generator 16 is now supplied to the battery 3 and the propulsive electric motor 4 while it is being increased or reduced by the incremental/decremental amount ΔPENE determined in the generation/charge process. Since the incremental/decremental amount ΔPENE is determined so as to fit the fuzzy rules in above Table according to the fuzzy reasoning from the vehicle operating conditions represented by the vehicle speed VCAR, the discharged depth DOD, and the consumed electric power PM, the electric generator 16 can generate an electric power output optimum for the vehicle operating conditions, and can increase or reduce the generated electric power output smoothly. The incremental/decremental amount ΔPENE is determined depending on not only the discharged depth DOD and the vehicle speed VCAR which affect the electric power consumption by the battery 3, but also the electric power PM consumed by the propulsive electric motor 4. Therefore, even when the vehicle is rapidly accelerated requiring the propulsive electric motor 4 to consume a large amount of electric power, the amount of electric power stored in the battery 3 is not quickly consumed, but the electric generator 16 can generate an electric power output to match the large electric power consumption by the propulsive electric motor 4 for thereby charging the battery 3. Actual operating conditions of the electric generator 16 and the internal combustion engine 14 in the above generation/charge process will be described later on.

The generation/charge process is continuously carried out until the discharged depth DOD of the battery 3 drops below 50% in the start decision process (STEP 1) of the main routine which is executed in every cycle time.

If DOD<50% in STEP 1-2 of the start decision process shown in FIG. 3, then control goes through STEPs 1-5, 1-6 to STEP 1-8 in which the start mode identifier S·SST is set to "0", whereupon the electric power generating apparatus 2 enters the non-start/stop mode. Since the internal combustion engine 14 has been operated, the adsorbed amount H/C of a purged gas in the canister 25 is smaller than the predetermined adsorbed amount H/C0, and hence control does not proceed from STEP 1-6 to STEP 1-7.

Figure 16:
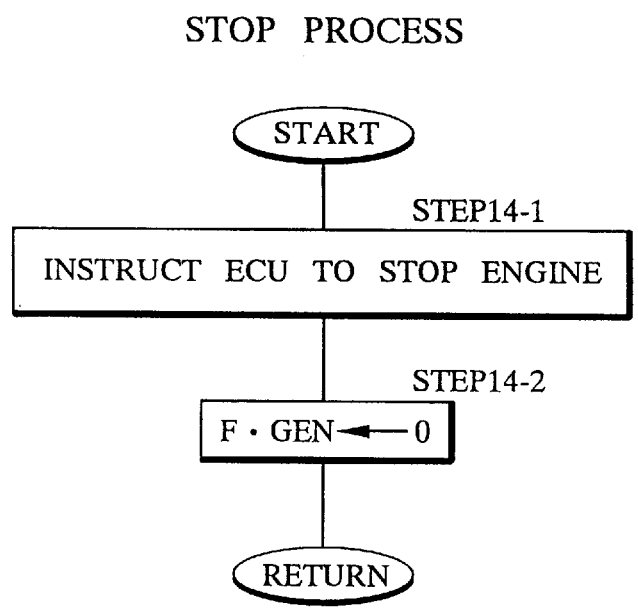
FIG. 16 is a flowchart of another subroutine in the main routine shown in FIG. 2.

Since S·SST=0 in STEP 2 of the main routine shown in FIG. 2, control now goes from STEP 2 to STEP 14 in which the electric power generation manager 20 executes a stop process as a subroutine. In the stop process, as shown in FIG. 16, the electric power generation manager 20 instructs the ECU 17 to stop the internal combustion engine 14 (STEP 14-1), and resets the start initiation flag F·GEN to "0" (STEP 14-2). Thereafter, control goes back to the main routine. The internal combustion engine 14 and the electric generator 16 coupled thereto stop their operation, and the electric power generating apparatus 2 stops its operation.

If the start mode identifier S·SST is set to "2" when the electric power generating apparatus 2 stops its operation in the start decision process (STEP 1), the electric power generating apparatus 2 now enters the canister purge mode. The start mode identifier S·SST is set to "2" when the adsorbed amount H/C of a purged gas in the canister 25, which is supplied from the H/C sensor to the electric power generation manager 20, is smaller than the predetermined adsorbed amount H/C0 while the electric power generating apparatus 2 stops its operation and the discharged depth DOD of the battery 3 is equal to or lower than 80%. In this case, the canister 25 needs to be purged.

When the canister purge mode (S·SST=2) is established in the start decision process in STEP 1 of the main routine shown in FIG. 2, the electric power generation manager 20 confirms that S·SST≠0 in STEP 2 and thereafter executes STEPs 3–9 in every cycle time to start the internal combustion engine 14 in the same manner as with the generation/charge mode.

If the full ignition decision flag F·FIR established in the engine start process in STEP 8 is "1", confirming that the internal combustion engine 14 is in a fully ignited condition, then control goes from STEP 5 to STEP 10. In STEP 10, the electric power generation manager 20 confirms that S·SST≠1. Thereafter, control proceeds to a purge process as a subroutine in STEP 15.

Figure 17:
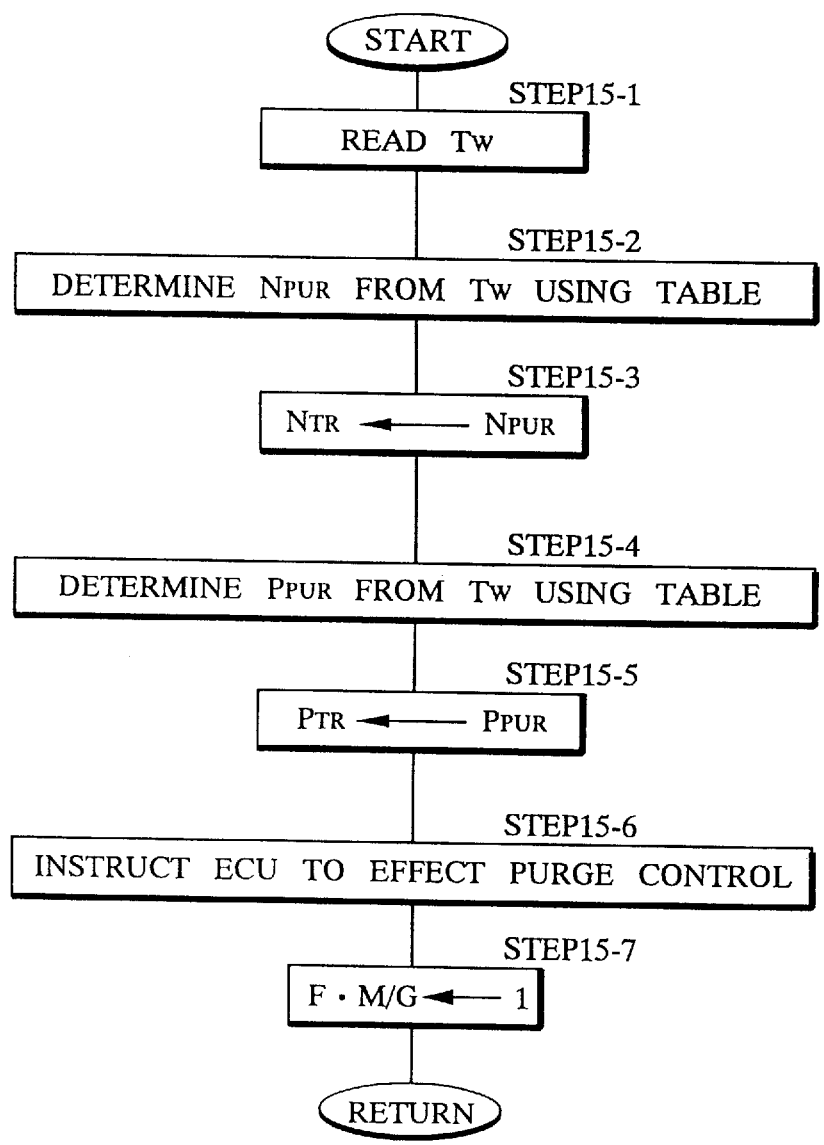
FIG. 17 is a flowchart of still another subroutine in the main routine shown in FIG. 2.

In the purge process, as shown in FIG. 17, the electric power generation manager 20 reads an engine temperature TW from the temperature sensor 21 (STEP 15-1), and determines a rotational speed NPUR at which to operate the internal combustion engine 14 (hereinafter referred to as a "purge rotational speed NPUR") for purging the canister 25 from the read engine temperature TW according to a data table shown in FIG. 18 (STEP 15-2), and then establishes the determined purge rotational speed NPUR as a target rotational speed NTR (STEP 15-3). In order to generate electric power from the electric generator 16 while purging the canister 25, the electric power generation manager 20 determines an electric power output PPUR to be generated by the electric generator 16 (hereinafter referred to as a "purge electric power output PPUR") from the read engine temperature TW according to a data table shown in FIG. 19 (STEP 15-4), and then establishes the determined purge electric power output PPUR as a target electric power output PTR (STEP 15-5).

Figure 18:
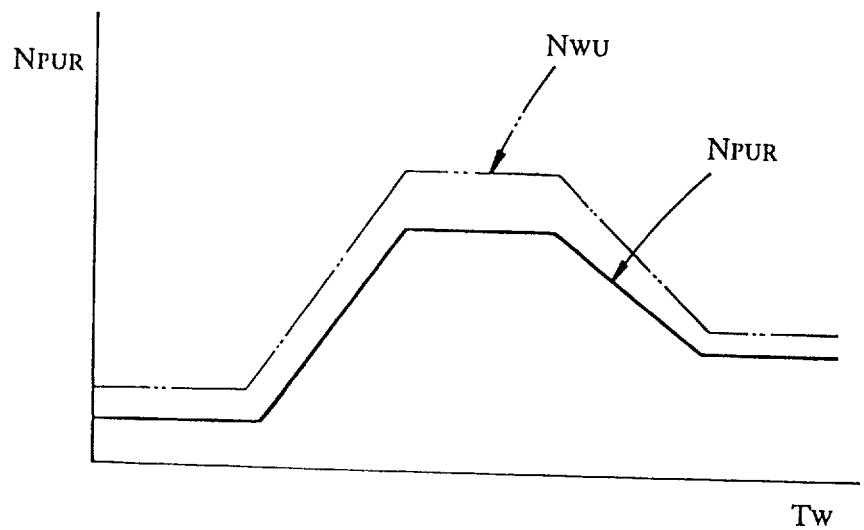
FIG. 18 is a diagram showing a data table used in the subroutine shown in FIG. 17.
Figure 19:
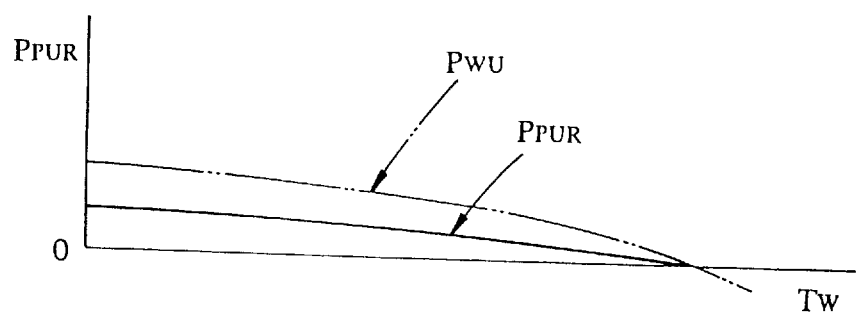
FIG. 19 is a diagram showing another data table used in the subroutine shown in FIG. 17.

The purge rotational speed NPUR in the data table shown in FIG. 18 and the purge electric power output PPUR in the data table shown in FIG. 19 are basically determined so as to be lower than the warming-up rotational speed NWU (indicated by the imaginary line in FIG. 18) and the warming-up electric power output PWU (indicated by the imaginary line in FIG. 19) respectively in the warming-up process, and also lower than a rotational speed NENE and a generated electric power output PENE in the generation/charge process, and also determined such that the load on the engine 14 is small or nil so as to be suitable for the engine temperature TW.

After having established the target rotational speed NTR (=NPUR) and the target electric power output PTR (=PPUR), the electric power generation manager 20 instructs the ECU 17 to effect a purge control process (STEP 15-6), and sets the generator/motor switching flag F·M/G to "1" in order to cause the electric generator 16 to generate electric power (STEP 15-7). Thereafter, control returns to the main routine.

Then, in the same manner as with the generation/charge mode, the electric power generation manager 20 executes the data output process (STEP 9) of the main routine, determines a target amount IGTR of electric energy to be supplied to the electric generator 16 and a target throttle valve opening THTR for the internal combustion engine 14 depending on the target rotational speed NTR (=NPUR) and the target electric power output PTR (=PPUR) established in the purge process, and outputs the target amount IGTR of electric energy and the target throttle valve opening THTR thus determined to the GCU 19 and the ECU 17 (STEPs 9-6~9-9 in FIG. 8).

The GCU 19 which is supplied with the target amount IGTR of electric energy controls the electric generator 16 through the generator power supply controller 18 in order to generate electric power with the electric generator 16 according to the target amount IGTR of electric energy. The ECU 17 which is supplied with the target throttle valve opening THTR controls the throttle valve opening of the internal combustion engine 14 through the throttle valve actuator 23 in order to equalize the throttle valve opening of the internal combustion engine 14 to the target throttle valve opening THTR.

The internal combustion engine 14 and the electric generator 16 are now operated at the target rotational speed NTR (=NPUR), and the electric generator 16 generates the target electric power output PTR (=PPUR) (generates no electric power output when PTR=0). The canister 25 of the fuel supply unit 24 is now purged, and the battery 3 is somewhat charged.

As described above, the purge rotational speed NPUR which is the target rotational speed NTR is set to a relatively low value, and the purge electric power output PPUR which is target electric power output PTR is also set to a relatively low value. Consequently, the load on the internal combustion engine 14 is small or nil. The canister 25 can thus be purged efficiently while the exhaust gases emitted from the internal combustion engine 14 are being minimized. Since a certain amount of electric power is generated by the electric generator 16, the battery 3 can somewhat be charged effectively utilizing drive forces which are produced by the internal combustion engine 14 to purge the canister 25.

If the adsorbed amount H/C of a purged gas in the canister 25 detected by the H/C sensor 26 becomes smaller than the predetermined adsorbed amount H/C0 while the canister 25 is being thus purged, control goes from STEP 1-6 to STEP 1-8 in the start decision process shown in FIG. 3, and the electric power generation manager 20 sets the start mode identifier S·SST to "0" (STEP 1-8), establishing the nonstart/stop mode. At this time, the electric power generation manager 20 executes the stop process in STEP 14 of the main routine (see FIGS. 2 and 16), stopping the operation of the electric power generating apparatus 2.

Actual operating conditions of the electric generator 16 and the internal combustion engine 14 in the above generation/charge process while the hybrid vehicle is running after the internal combustion engine 14 has been warmed up will be described below with reference to FIGS. 20(A)~20(D) and FIGS. 21(A)~21(D).

Figure 20A:
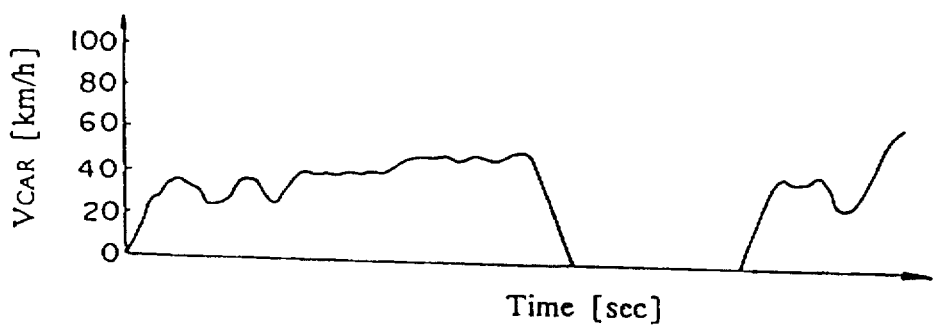
FIG. 20(A) is a diagram showing an operating condition while the hybrid vehicle shown in FIG. 1 is running.
Figure 20B:
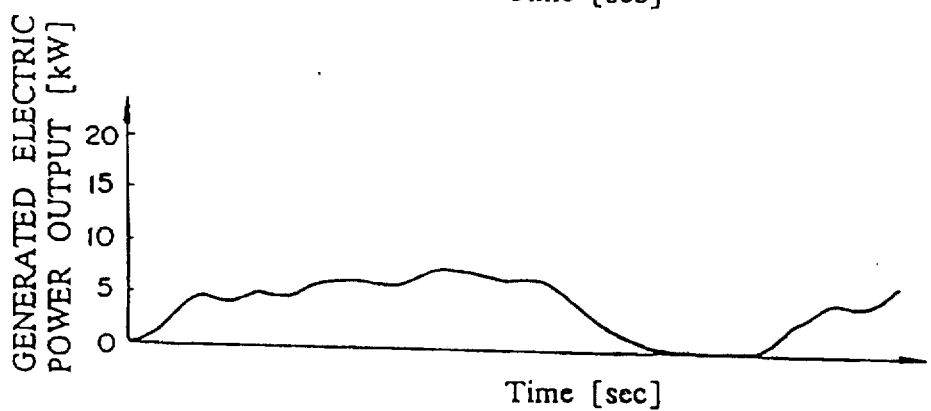
FIG. 20(B) is a diagram showing another operating condition while the hybrid vehicle shown in FIG. 1 is running.
Figure 20C:
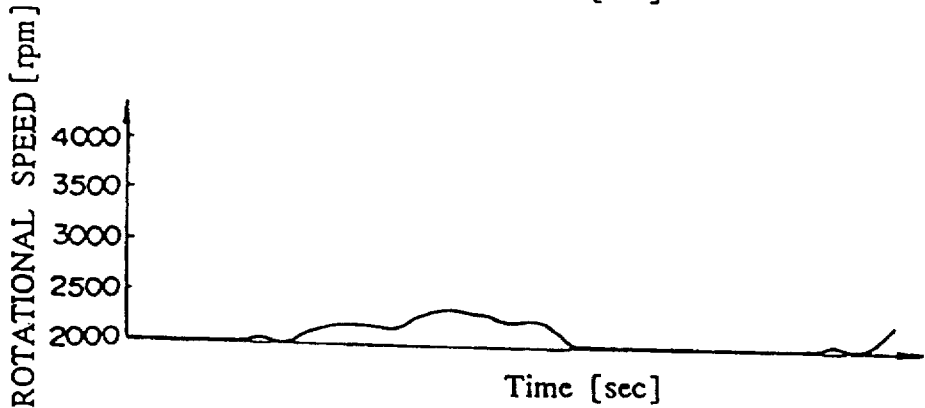
FIG. 20(C) is a diagram showing still another operating condition while the hybrid vehicle shown in FIG. 1 is running.
Figure 20D:
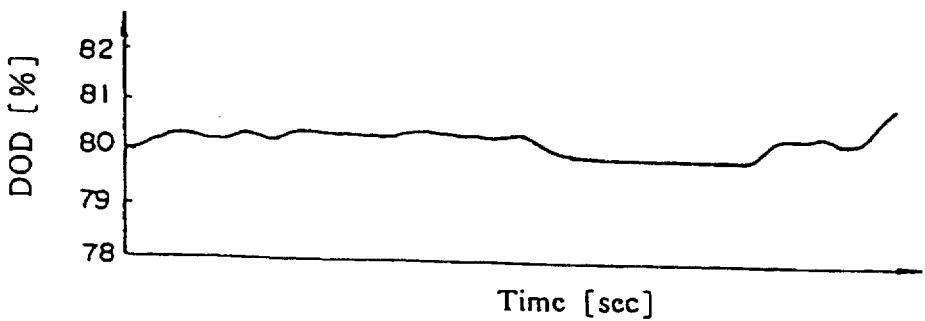
FIG. 20(D) is a diagram showing yet still another operating condition while the hybrid vehicle shown in FIG. 1 is running.
Figure 21A:
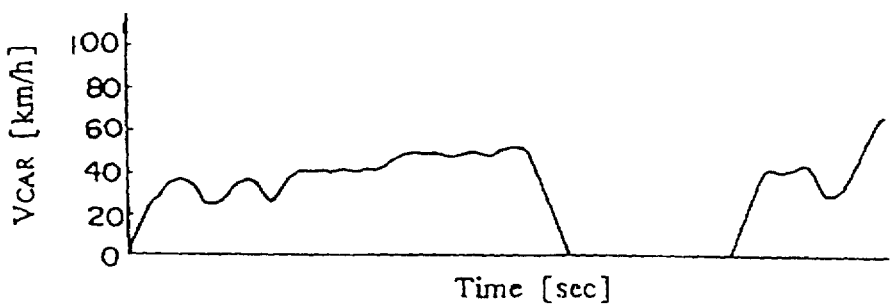
Figure 21B:
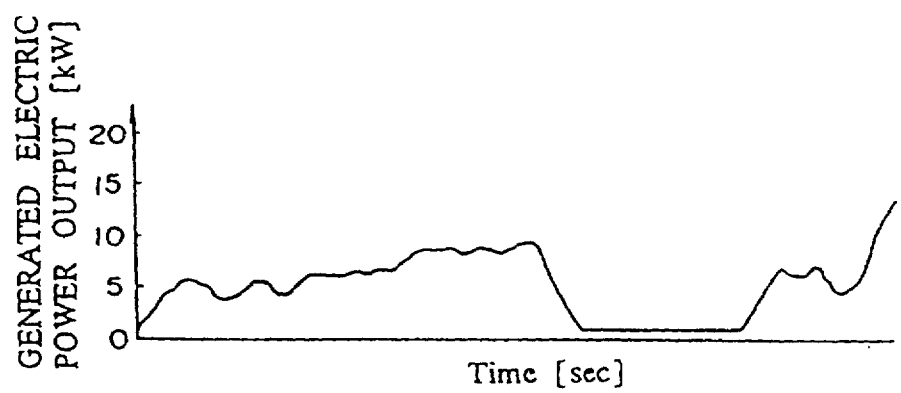
Figure 21C:
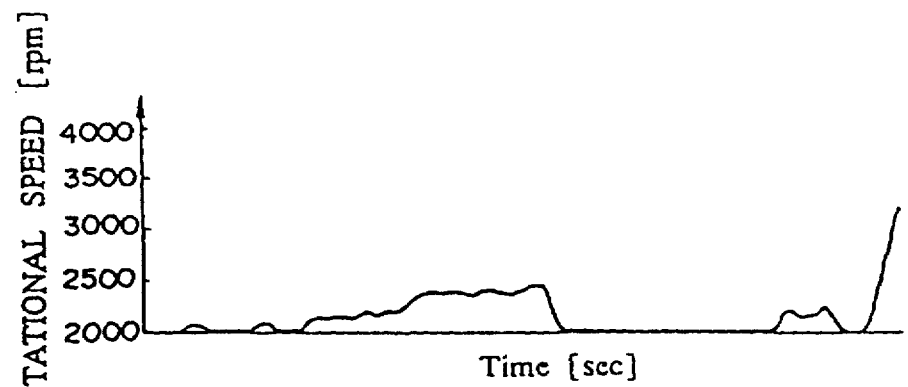
Figure 21D:
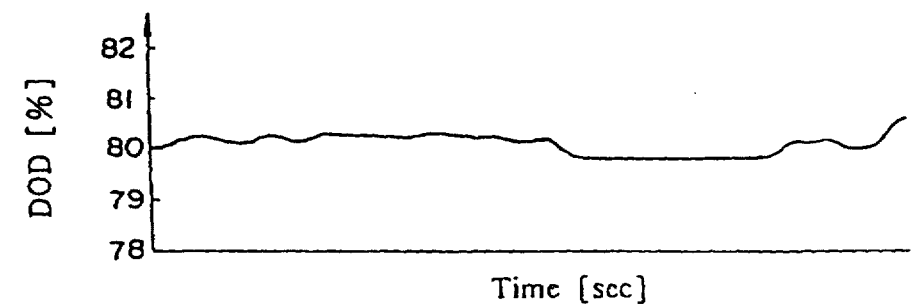

FIGS. 20(A)~20(D) show actual operating conditions of the electric generator 16 and the internal combustion engine 14 when the hybrid vehicle is running after the internal combustion engine 14 has been warmed up. FIG. 20(A) is a diagram showing the manner in which the vehicle speed VCAR varies. FIG. 20(B) is a diagram showing the manner in which the electric power output generated by the electric generator 16 varies. FIG. 20(C) is a diagram showing the manner in which the rotational speed of the internal combustion engine 14 varies. FIG. 20(D) is a diagram showing the manner in which the discharged depth DOD of the battery 3 varies.

Figure 21A:
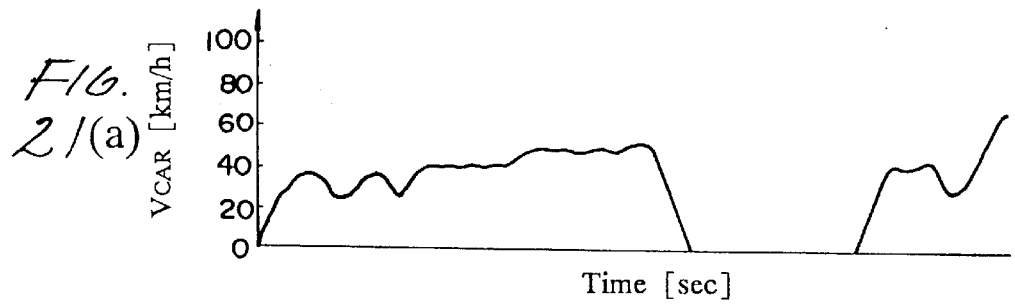
FIG. 21(A) is a diagram showing an operating condition while a conventional hybrid vehicle is running.
Figure 21B:
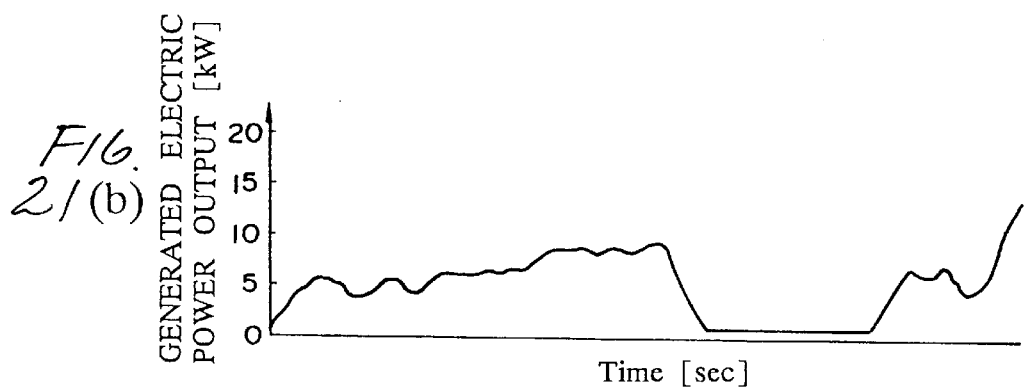
FIG. 21(B) is a diagram showing another operating condition while the conventional hybrid vehicle is running.
Figure 21C:
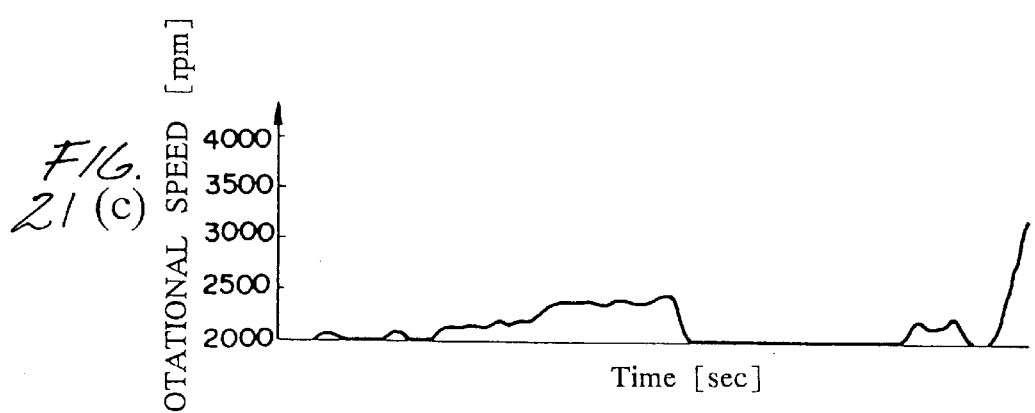
FIG. 21(C) is a diagram showing still another operating condition while the conventional hybrid vehicle is running.
Figure 21D:
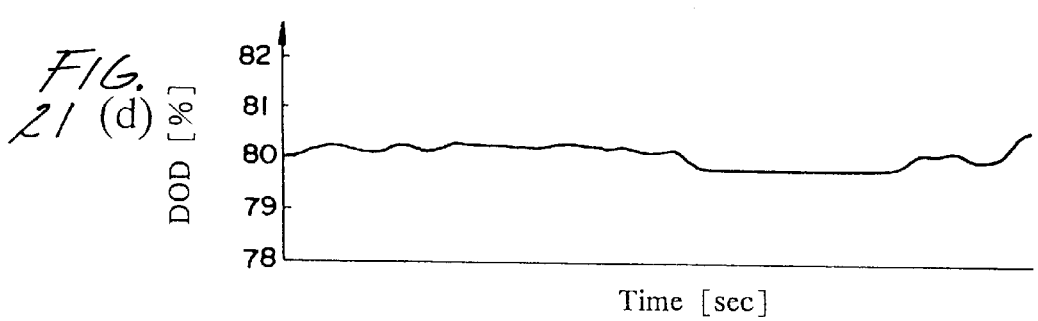
FIG. 21(D) is a diagram showing yet still another operating condition while the conventional hybrid vehicle is running.

FIGS. 21(A)~21(D) show actual operating conditions of the electric generator and the internal combustion engine when a hybrid vehicle carrying the above conventional electric power generating apparatus is running, for comparison with the actual operating conditions of the electric generator 16 and the internal combustion engine 14 on the hybrid vehicle according to the above embodiment. FIG. 21(A) is a diagram showing the manner in which the vehicle speed VCAR varies. FIG. 21(B) is a diagram showing the manner in which the electric power output generated by the electric generator varies. FIG. 21(C) is a diagram showing the manner in which the rotational speed of the internal combustion engine varies. FIG. 21(D) is a diagram showing the manner in which the discharged depth DOD of the battery varies. The vehicle speeds VCAR shown in FIGS. 20(A) and 21(B) vary in the same manner as each other. On the conventional hybrid vehicle, for controlling the electric generator and the internal combustion engine after the internal combustion engine has been warmed up, as disclosed in Japanese patent applications Nos. 6-197071 and 6-197072, a target rotational speed for the internal combustion engine is determined according to a predetermined data table from the vehicle speed VCAR, and a target electric power output to be generated by the electric generator is determined according to a predetermined map from a remaining capacity corresponding to the discharged depth DOD of the battery and the vehicle speed VCAR. The electric generator and the internal combustion engine are controlled to rotate at the target rotational speed for generating the target electric power output.

On the conventional hybrid vehicle, as shown in FIGS. 21(A)~21(D), as the vehicle speed VCAR varies, the discharged depth DOD of the battery remains substantially constant, and the electric generator generates electric power depending on running conditions of the hybrid vehicle. However, the electric power output generated by electric generator and the rotational speed of the internal combustion engine vary substantially with the vehicle speed VCAR, and hence vary relatively greatly when the vehicle speed VCAR varies to a large extent.

According to the embodiment of the present invention, as shown in FIGS. 20(A)~20(D), as the vehicle speed VCAR varies, the discharged depth DOD of the battery 3 remains substantially constant, and the electric generator generates electric power depending on running conditions of the hybrid vehicle, substantially in the same manner as with the conventional hybrid vehicle. However, while the electric power output generated by electric generator 16 and the rotational speed of the internal combustion engine 14 vary substantially with the vehicle speed VCAR, they vary smoothly, and do not vary greatly when the-vehicle speed VCAR varies abruptly to a large extent.

On the hybrid vehicle according to the embodiment of the present invention, therefore, the electric generator 16 can generate electric power in a manner to match the vehicle operating conditions represented by the vehicle speed VCAR, the discharged depth DOD, etc., and the electric power output generated by electric generator 16 and the notational speed of the internal combustion engine 14 vary smoothly even when the vehicle speed VCAR varies sharply. Consequently, the emission and vibration control capabilities of the internal combustion engine 14 can be improved as compared with the internal combustion engine on the conventional hybrid vehicle.

Although a certain preferred embodiment of the present invention has been shown and described in detail, it should be understood that various changes and modifications may be made therein without departing from the scope of the appended claims.

What is claimed is:

1. A control system for controlling an electric power generating apparatus having an electric generator and mounted on a hybrid vehicle which has a propulsive electric motor powered by a battery and an internal combustion engine for actuating the electric generator to generate an electric power output to charge the battery, comprising:

operating condition detecting means for detecting, from time to time, vehicle operating conditions including at least a charged and discharged condition of the battery and a vehicle speed of the hybrid vehicle;

fuzzy reasoning memory means for storing beforehand a membership function and a plurality of fuzzy rules to determine an operational amount for the electric generator from said vehicle operating conditions by way of fuzzy reasoning;

goodness-of-fit calculating means for determining goodnesses of fit of the respective fuzzy rules based on said membership function from said vehicle operating conditions detected by said operating condition detecting means;

generator operational amount calculating means for combining the goodnesses of fit of the respective fuzzy rules determined by said goodness-of-fit calculating means and determining an operational amount for the electric generator based on the combined goodnesses of fit; and control means for controlling the electric power generating apparatus according to the operational amount for the electric generator determined by said generator operational amount calculating means.

2. A control system according to claim 1, wherein said vehicle operating conditions include a power output produced by said propulsive electric motor, and said membership function and said fuzzy rules comprise a membership function and a plurality of fuzzy rules to determine an operational amount for the electric generator from said vehicle operating conditions including the charged and discharged condition of the battery and the power output produced by said propulsive electric motor by way of fuzzy reasoning.

3. A control system according to claim 2, wherein said fuzzy rules are determined so as to increase the electric power output generated by the electric generator as an amount of electric energy stored in the battery which is represented by the charged and discharged condition of the battery decreases.

4. A control system according to claim 2, wherein said fuzzy rules are determined so as to increase the electric power output generated by the electric generator as the vehicle speed increases.

5. A control system according to claim 2, wherein said fuzzy rules are determined so as to increase the electric power output generated by the electric generator as the power output produced by said propulsive electric motor increases.

6. A control system according to claim 1, wherein said operational amount for the electric generator determined by said generator operational amount calculating means comprises an incremental/decremental amount for the electric power output generated by the electric generator, said control means comprising means for increasing or reducing a throttle valve opening of the internal combustion engine to increase or reduce electric power output generated by the electric generator with said incremental/decremental amount.

7. A control system according to claim 6, wherein said control means comprises means for establishing an incremental/decremental amount for said throttle valve opening to increase or reduce the throttle valve opening, depending on the operational amount for the electric generator determined by said generator operational amount calculating means and a rotational speed of the internal combustion engine.

* * * * *

UNITED STATES PATENT AND TRADEMARK OFFICE
CERTIFICATE OF CORRECTION

PATENT NO. : 5,867,009
DATED : February 2, 1999
INVENTOR(S) : Takeo Kiuchi et al It is certified that error appears in the above-identified patent and that said Letters Patent is hereby corrected as shown below:

Drawings,
Sheet 16 legends for the figures are changed from figs. 20(a), 20(b), 20(c)

Signed and Sealed this

Ninth Day of October, 2001

Attest:

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO.   : 5,867,009
DATED        : February 2, 1999
INVENTOR(S)  : Takeo Kiuchi et al It is certified that error appears in the above-identified patent and that said Letters Patent is hereby corrected as shown below:

Drawings,
Sheet 16, legends for the figures are changed from Figs. 20(a), 20(b), 20(c) and 20(d) to read -- 20A, 20B, 20C, and 20D --, respectively.
Sheet 17, legends for the figs. 21(a), 21(b), 21(c) and 21(d) are changed to read -- 21A, 21B, 21C, and 21D, -- respectively and -- (PRIOR ART) -- should be entered below each Figure number.

Signed and Sealed this

Sixteenth Day of October, 2001

Attest:

NICHOLAS P. GODICI
Attesting Officer   Acting Director of the United States Patent and Trademark Office